US012574804B2

(12) United States Patent
Da Silva et al.

(10) Patent No.: US 12,574,804 B2
(45) Date of Patent: Mar. 10, 2026

(54) HANDLING OF DIFFERENT MEASUREMENT CONFIGURATIONS AT CONDITIONAL PSCELL CHANGE

(71) Applicant: Telefonaktiebolaget LM Ericsson (publ), Stockholm (SE)

(72) Inventors: Icaro Leonardo Da Silva, Solna (SE); Cecilia Eklöf, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 355 days.

(21) Appl. No.: 18/033,271

(22) PCT Filed: Oct. 22, 2021

(86) PCT No.: PCT/IB2021/059770
§ 371 (c)(1),
(2) Date: Apr. 21, 2023

(87) PCT Pub. No.: WO2022/084945
PCT Pub. Date: Apr. 28, 2022

(65) Prior Publication Data
US 2023/0413124 A1 Dec. 21, 2023

Related U.S. Application Data

(60) Provisional application No. 63/105,682, filed on Oct. 26, 2020, provisional application No. 63/105,000, filed on Oct. 23, 2020.

(51) Int. Cl.
*H04W 4/00* (2018.01)
*H04W 36/00* (2009.01)
*H04W 36/36* (2009.01)

(52) U.S. Cl.
CPC . *H04W 36/0016* (2013.01); *H04W 36/00698* (2023.05); *H04W 36/0085* (2018.08); *H04W 36/362* (2023.05)

(58) Field of Classification Search
CPC ......... H04W 36/0016; H04W 36/0085; H04W 36/00698; H04W 36/362
See application file for complete search history.

(56) References Cited

U.S. PATENT DOCUMENTS

| | | | |
|---|---|---|---|
| 2022/0086704 A1* | 3/2022 | Futaki | H04W 36/00698 |
| 2022/0322141 A1* | 10/2022 | Wu | H04W 24/08 |

(Continued)

FOREIGN PATENT DOCUMENTS

| | | |
|---|---|---|
| WO | 2020144919 A1 | 7/2020 |
| WO | 2020162811 A1 | 8/2020 |

OTHER PUBLICATIONS

International Search Report and Written Opinion dated Jan. 25, 2022 issued in International Patent Application No. PCT/IB2021/059770 (16 pages).

(Continued)

*Primary Examiner* — Abdelnabi O Musa
(74) *Attorney, Agent, or Firm* — Rothwell, Figg, Ernst & Manbeck, P.C.

(57) ABSTRACT

A method (700) performed by a UE (401). The method includes receiving (s702) from a MN (402) a first RRC reconfiguration message (RRCReconfiguration). The RRCReconfiguration message comprises: i) a second RRC reconfiguration message, RRCReconfiguration*, generated by an S-SN (403), wherein the RRCReconfiguration* message comprises a measurement configuration; and ii) a conditional reconfiguration IE (e.g., ConditionalReconfiguration IE) generated by the MN, wherein the conditional reconfiguration IE contains at least a first measurement ID that the MN obtained from S-SN, and the first measurement ID is associated with the measurement configuration.

16 Claims, 17 Drawing Sheets

(56) References Cited

U.S. PATENT DOCUMENTS

2022/0377626 A1* 11/2022 Kim ...................... H04W 76/27
2022/0394583 A1* 12/2022 Deenoo .............. H04W 36/305

OTHER PUBLICATIONS

Ericsson, "Conditional reconfigurations", R2-2007599, 3GPP TSG-RAN WG2 #111, Electronic meeting, Aug. 17-28, 2020, XP051911073 (10 pages).
CATT (Rapporteur), "Report on Email Discussion [107b#52][NR MobE] Open Issues Conditional PSCell Addition/Change (CATT)", R2-1915962, 3GPP TSG-RAN WG2 Meeting #108, Reno, USA, Nov. 18-22, 2019, XP051817520 (46 pages).
Ericsson, "Conditional PSCell Change/ Addition", R2-2101270, 3GPP TSG-RAN WG2 #113e, Electronic meeting, Jan. 25-Feb. 5, 2021, XP051972868 (12 pages).
Huawei et al., "Discussion on support of conditional PSCell change/ addition", R2-2010125, 3GPP TSG-RAN WG3 Meeting #112-e, Online, Nov. 2-13, 2020, XP051941553 (8 pages).
3GPP TS 38.423 V16.3.0, Sep. 2020, Technical Specification, 3rd Generation Partnership Project; Technical Specification Group Radio Access Network; NG-RAN; Xn application protocol (XnAP) (Release 16) (451 pages).
3GPP TS 38.331 V16.2.0, Sep. 2020, Technical Specification, 3rd Generation Partnership Project; Technical Specification Group Radio Access Network; NR; Radio Resource Control (RRC) protocol specification (Release 16) (921 pages).
3GPP TS 37.340 V16.3.0, Sep. 2020, Technical Specification, 3rd Generation Partnership Project; Technical Specification Group Radio Access Network; Evolved Universal Terrestrial Radio Access (E-UTRA) and NR; Multi-connectivity; Stage 2 (Release 16) (83 pages).
3GPP TS 38.300 V16.3.0, Sep. 2020, Technical Specification, 3rd Generation Partnership Project; Technical Specification Group Radio Access Network; NR; NR and NG-RAN Overall Description; Stage 2 (Release 16) (148 pages).
Ericsson, "Conditional PSCell addition/change", 3GPP TSG-RAN WG2 #108, R2-1914637, Reno, Nevada, USA, Nov. 18-22, 2019.
CATT (Rapporteur), "Report on Email Discussion [107b#52][NR MobE] Open Issues Conditional PSCell Addition/ Change (CATT", R2-1916300, 3GPP TSG-RAN WG2 Meeting #108, Reno, USA, Nov. 18-22, 2019 (46 pages).
Huawei et al., "Discussion on Conditional PSCell addition/change", R2-2007679, 3GPP TSG-RAN WG2#111-e, Online, Aug. 17-28, 2020 (7 pages).

* cited by examiner

700

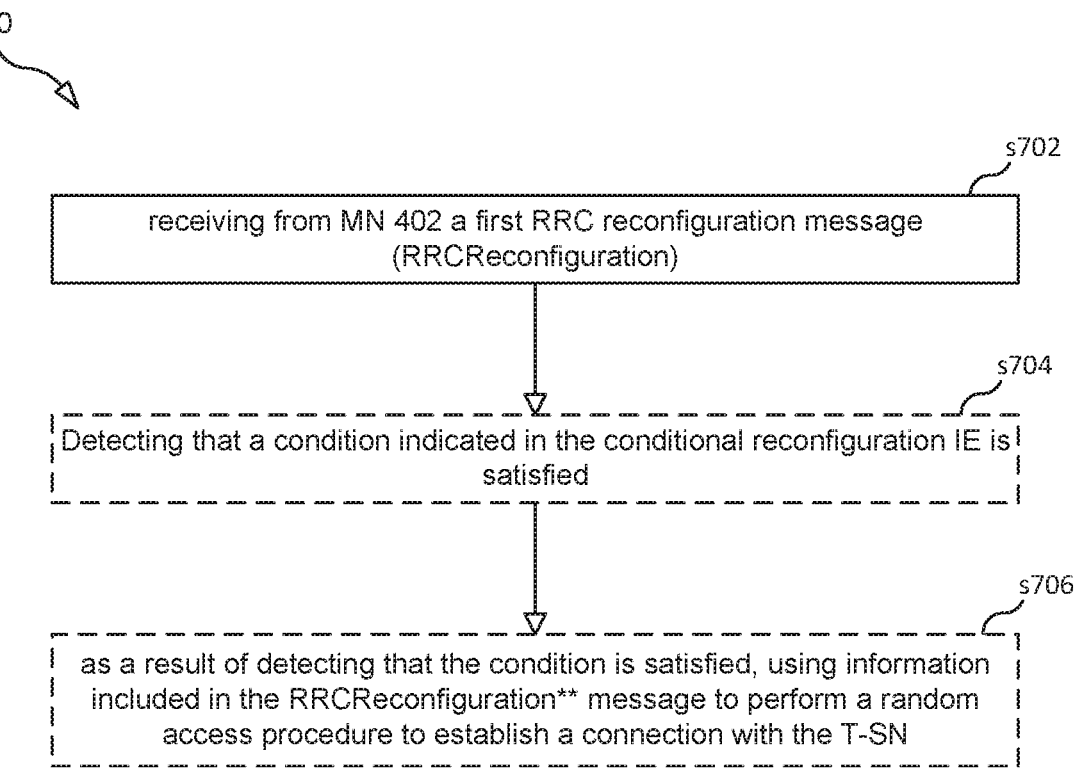

s702 receiving from MN 402 a first RRC reconfiguration message
(RRCReconfiguration)

s704

Detecting that a condition indicated in the conditional reconfiguration IE is
satisfied s706 as a result of detecting that the condition is satisfied, using information
included in the RRCReconfiguration** message to perform a random
access procedure to establish a connection with the T-SN

FIG. 7

800 s802 receiving from S-SN 403 a message that comprises: i) at least a first measurement ID and ii) a first RRC reconfiguration message (RRCReconfiguration***) that comprises a measurement configuration s804 transmitting to UE 401 a second RRC reconfiguration message (RRCReconfiguration) that comprises the RRCReconfiguratio*** message

900

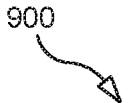

s902

transmitting to MN 402 a message associated with UE 401, the message comprises i) at least a first measurement ID and ii) a first RRC reconfiguration message (RRCReconfiguration\*\*\*) that comprises a measurement configuration s904 receiving an RRC reconfiguration complete message corresponding to the RRCReconfiguration\*\*\* message, wherein the RRC reconfiguration complete message was transmitted to the MN by the UE and relayed by the MN to the S-SN

FIG. 9

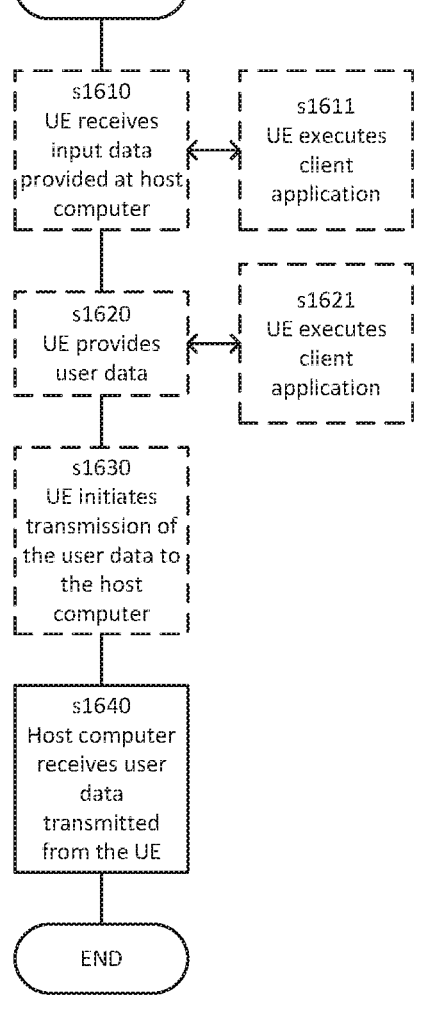

BEGIN s1610
UE receives
input data
provided at host
computer s1611
UE executes
client
application s1620
UE provides
user data s1621
UE executes
client
application s1630
UE initiates
transmission of
the user data to
the host
computer s1640
Host computer
receives user
data
transmitted
from the UE

END

FIG. 16

BEGIN s1710
Base station
receives user
data from UE s1720
Base station
initiates
transmission of
user data to the
host computer s1730
Host computer
receives the
user data

END

FIG. 17

HANDLING OF DIFFERENT MEASUREMENT CONFIGURATIONS AT CONDITIONAL PSCELL CHANGE

CROSS REFERENCE TO RELATED APPLICATIONS

This application is a 35 U.S.C. § 371 National Stage of International Patent Application No. PCT/IB2021/059770, filed Oct. 22, 2021, which claims priority to U.S. provisional application Nos. 63/105,000, filed Oct. 23, 2020 and 63/105,682, filed Oct. 26, 2020. The above identified U.S. provisional applications are incorporated by this reference.

TECHNICAL FIELD

This disclosure relates to conditional primary secondary cell (PSCell) change.

BACKGROUND

Conditional Handover (CHO)

Two new work items for mobility enhancements in Long Term Evolution (LTE) (a.k.a., 4G) and New Radio (NR) (a.k.a., 5G) have started in 3GPP release 16. The main objectives of the work items are to improve the robustness at handover and to decrease the interruption time at handover.

One problem related to robustness at handover is that the HO Command (RRCConnectionReconfiguration with mobilityControlInfo and RRCReconfiguration with a reconfigurationWithSync field) is normally sent when the radio conditions for the UE are already quite bad. That may lead to that the HO Command may not reach the UE in time if the message is segmented or there are retransmissions.

In LTE and NR, different solutions to increase mobility robustness have been discussed in the past. One solution discussed in NR is called "conditional handover" or "early handover command". In order to avoid the undesired dependence on the serving radio link upon the time (and radio conditions) where the UE should execute the handover, the possibility to provide RRC signaling for the handover to the UE earlier should be provided. To achieve this, it should be possible to associate the HO command with a condition e.g. based on radio conditions possibly similar to the ones associated to an A3 event, where a given neighbour becomes X db better than target. As soon as the condition is fulfilled, the UE executes the handover in accordance with the provided handover command Such a condition could e.g. be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold) which is considered optimal for the handover execution.

FIG. 1 depicts an example with just a serving and a target cell. In practice there may often be many cells or beams that the UE reported as possible candidates based on its preceding RRM measurements. The network should then have the freedom to issue conditional handover commands for several of those candidates. The RRCConnectionReconfiguration for each of those candidates may differ e.g. in terms of the HO execution condition (RS to measure and threshold to exceed) as well as in terms of the RA preamble to be sent when a condition is met.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell. These steps are equivalent to the current, instantaneous handover execution.

Conditional handover is described in stage 2, TS 38.300 in chapter 9.2.3.4, a portion of which is reproduced below:

TS 38.300 Chapter 9.2.3.4

9.2.3.4 Conditional Handover 9.2.3.4.1 General

A Conditional Handover (CHO) is defined as a handover that is executed by the UE when one or more handover execution conditions are met. The UE starts evaluating the execution condition(s) upon receiving the CHO configuration, and stops evaluating the execution condition(s) once the execution condition(s) is met.

The following principles apply to CHO:

1. The CHO configuration contains the configuration of CHO candidate cell(s) generated by the candidate gNB(s) and execution condition(s) generated by the source gNB.

2. An execution condition may consist of one or two trigger condition(s) (CHO events A3/A5, as defined in [12]). Only a single RS type is supported and at most two different trigger quantities (e.g. RSRP and RSRQ, RSRP and SINR, etc.) can be configured simultaneously for the evaluation of CHO execution condition of a single candidate cell.

3. Before any CHO execution condition is satisfied, upon reception of HO command (without CHO configuration), the UE executes the HO procedure as described in clause 9.2.3.2, regardless of any previously received CHO configuration.

4. While executing CHO, i.e., from the time when the UE starts synchronization with target cell, UE does not monitor source cell.

9.2.3.4.2 C-Plane Handling

As in intra-NR RAN handover, in intra-NR RAN CHO, the preparation and execution phase of the conditional handover procedure is performed without involvement of the 5GC; i.e., preparation messages are directly exchanged between gNBs. The release of the resources at the source gNB during the conditional handover completion phase is triggered by the target gNB. FIG. 2 depicts the basic conditional handover scenario where neither the AMF nor the UPF changes.

0/1. Same as step 0, 1 in FIG. 9.2.3.2.1-1 of section 9.2.3.2.1.

2. The source gNB decides to use CHO.

3. The source gNB issues a Handover Request message to one or more candidate gNBs.

4. Same as step 4 in FIG. 9.2.3.2.1-1 of section 9.2.3.2.1.

5. The candidate gNB sends HANDOVER REQUEST ACKNOWLEDGE message including configuration of CHO candidate cell to the source gNB.

6. The source gNB sends an RRCReconfiguration message to the UE, containing the configuration of CHO candidate cell(s) and CHO execution condition(s).

7. UE sends an RRCReconfigurationComplete message to the source gNB.

8. UE maintains connection with source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that selected candidate cell, synchronises to that candidate cell and completes the RRC handover procedure by sending RRCReconfigurationComplete message to the target gNB. The UE releases stored CHO configurations after successful completion of RRC handover procedure.

End TS 38.300 Chapter 9.2.3.4

Cancellation in Conditional Handover

In 3GPP Release 16 (rel-16), the possibility for a candidate target node to cancel one or multiple candidate target cells already prepared for a CHO has been standardized. A new Conditional Handover Cancel procedure was added to 3GPP TS 38.423, a portion of which is introduced below:

8.2.9.1 General

The Conditional Handover Cancel procedure is used to enable a target NG-RAN node to cancel an already prepared conditional handover. The procedure uses UE-associated signalling.

8.2.9.2 Successful Operation

The target NG-RAN node initiates the procedure by sending the CONDITIONAL HANDOVER CANCEL message to the source NG-RAN node. The target NG-RAN node shall indicate the reason for cancelling the conditional handover by means of an appropriate cause value. At the reception of the CONDITIONAL HANDOVER CANCEL message, the source NG-RAN node shall consider that the target NG-RAN node is about to remove any reference to, and release any resources previously reserved for candidate cells associated to the UE-associated signalling identified by the Source NG-RAN node UE XnAP ID IE and the Target NG-RAN node UE XnAP ID IE. If the Candidate Cells To Be Cancelled List IE is included in CONDITIONAL HANDOVER CANCEL message, the source NG-RAN node shall consider that only the resources reserved for the cells identified by the included NG-RAN CGI are about to be released.

8.2.9.3 Unsuccessful Operation

Not applicable.

8.2.9.4 Abnormal Conditions

If the CONDITIONAL HANDOVER CANCEL message refers to a context that does not exist, the source NG-RAN node shall ignore the message.

If one or more candidate cells in the Candidate Cells To Be Cancelled List IE included in the CONDITIONAL HANDOVER CANCEL message were not prepared using the same UE-associated signaling connection, the source NG-RAN node shall ignore those non-associated candidate cells.

End 3GPP TS 38.423

Primary Secondary Cell (PSCell) Addition

A UE can be configured with Dual Connectivity, communicating both via a Master Cell Group (MCG) and a Secondary Cell Group (SCG). When the UE is configured with dual connectivity, the UE is configured with two MAC entities: one MAC entity for the MCG and one MAC entity for the SCG. In Multi-Radio Dual Connectivity (MR-DC) the cell groups are located in two different logical nodes, i.e. different NG-RAN nodes, possibly connected via a non-ideal backhaul, one providing NR access and the other one providing either E-UTRA or NR access. One node act as a Master Node (MN) and the other as a Secondary Node (SN).

The MN and SN are connected via a network interface and at least the MN is connected to the core network. The operation in MR-DC involves different reconfiguration procedures, like secondary node addition, secondary node modification, secondary node release and secondary node change.

FIG. 3 shows a signaling flow (FIG. 10.2.2-1) from 3GPP TS 37.340 V16.7.0 ("TS 37.340") for the SN addition procedure, leading to a PSCell Change addition. The SN Addition procedure is initiated by the MN and is used to establish a UE context at the SN in order to provide resources from the SN to the UE. For bearers requiring SCG radio resources, this procedure is used to add at least the initial SCG serving cell of the SCG. This procedure can also be used to configure an SN terminated MCG bearer (where no SCG configuration is needed).

The steps shown in FIG. 3 are described below:

1. The MN decides to request the target SN to allocate resources for one or more specific PDU Sessions/QoS Flows, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. In NGEN-DC and NR-DC, the MN always provides all the needed security information to the SN (even if no SN terminated bearers are setup) to enable SRB3 to be setup based on SN decision.

For MN terminated bearer options that require Xn-U resources between the MN and the SN, the MN provides Xn-U UL TNL address information. For SN terminated bearers, the MN provides a list of available DRB IDs. The S-NG-RAN node shall store this information and use it when establishing SN terminated bearers. The SN may reject the request.

For SN terminated bearer options that require Xn-U resources between the MN and the SN, the MN provides in step 1 a list of QoS flows per PDU Sessions for which SCG resources are requested to be setup upon which the SN decides how to map QoS flows to DRB.

For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signalled to the SN, which may differ from QoS Flow parameters received over NG.

For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

2. If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration can be performed. The SN decides for the PSCell and other SCG SCells and provides the new SCG radio resource configuration to the MN within an SN RRC configuration message contained in the SN Addition Request Acknowledge message. In case of bearer options that require Xn-U resources between the MN and the SN, the SN provides Xn-U TNL address information for the respective DRB, Xn-U UL TNL address information for SN terminated bearers, Xn-U DL TNL address information for MN terminated bearers. For SN terminated bearers, the SN provides the NG-U DL TNL address information for the respective PDU Session and security algorithm If SCG radio resources have been requested, the SCG radio resource configuration is provided.

In case of MN terminated bearers, transmission of user plane data may take place after step 2. In case of SN terminated bearers, data forwarding and the SN Status Transfer may take place after step 2. For MN terminated NR SCG bearers for which PDCP duplication with CA is configured the MN allocates two separate Xn-U bearers. For SN terminated NR MCG bearers for which PDCP duplication with CA is configured, the SN allocates two separate Xn-U bearers.

2a. For SN terminated bearers using MCG resources, the MN provides Xn-U DL TNL address information in the Xn-U Address Indication message.

3. The MN sends the MN RRC reconfiguration message to the UE including the SN RRC configuration message, without modifying it.

4. The UE applies the new configuration and replies to MN with MN RRC reconfiguration complete message, including an SN RRC response message for SN, if needed. In case the UE is unable to comply with (part of) the configuration included in the MN RRC reconfiguration message, it performs the reconfiguration failure procedure.

5. The MN informs the SN that the UE has completed the reconfiguration procedure successfully via SN Reconfiguration Complete message, including the SN RRC response message, if received from the UE.

6. If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure.

7. If PDCP termination point is changed to the SN for bearers using RLC AM, and when RRC full configuration is not used, the MN sends the SN Status Transfer.

8. For SN terminated bearers or QoS flows moved from the MN, dependent on the characteristics of the respective bearer or QoS flow, the MN may take actions to minimise service interruption due to activation of MR-DC (Data forwarding).

9-12. If applicable, the update of the UP path towards the 5GC is performed via a PDU Session Path Update procedure.

Conditional PSCell Change (CPC)

A solution for Conditional PSCell Change (CPC) procedure was standardized in 3GPP release 16 (rel-16). Therein a UE operating in Multi-Radio Dual Connectivity (MR-DC) receives in a conditional reconfiguration one or multiple RRC Reconfiguration(s) (e.g. an RRCReconfiguration message) containing an SCG configuration (e.g. an secondary-CellGroup of IE CellGroupConfig) with a reconfiguration-WithSync that is stored and associated to an execution condition (e.g. a condition like an A3/A5 event configuration), so that one of the stored messages is only applied upon the fulfillment of the execution condition e.g. associated with the serving PSCell, upon which the UE would perform PSCell change (in case it find a neighbour cell that is better than the current SpCell of the SCG).

In rel-16, CPC will be supported, but in 3GPP release 17 (rel-17) also PSCell Addition will be included, i.e. Conditional PSCell Addition/Change (CPAC). In rel-16 only intra-SN CPC without MN involvement is standardized. Inter SN PSCell CPC and CPC with MN involvement will be included in rel-17.

As described above, in rel-16 only the case intra-SN case without MN involvement for CPC is supported, i.e. where S-SN and T-SN are the same node in picture 10.5.1-2 from TS 37.340. That means that the cell is changed, but both the old and the new cell are in the same node.

In rel-17 the remaining scenarios are standardized. These are: Conditional PSCell Addition (MN initiated); MN initiated intra-SN Conditional PSCell Change; MN initiated inter-SN Conditional PSCell Change; SN-initiated inter-SN Conditional PSCell Change

SUMMARY

Certain challenges presently exist. For example, in an inter-SN SN-initiated Conditional PSCell Change it is preferable that the MN builds the final message to the UE containing the conditional reconfiguration in order to allow MN reconfiguration when the condition(s) are fulfilled. That may be necessary in several cases as, for example, the bearers may change when the SN is changed. However, it is desired that the SN sets the conditions for the conditional PSCell Change, as it may be based on the current conditions in the SCG that the conditional PSCell Change should be carried out. It is the SN that has the knowledge about the conditions in the SN.

Discussions in 3GPP have started and a possible solution is to define an SN-initiated Conditional PSCell Change (CPC). In that solution, the source SN is likely the network node to determine the execution conditions. In the Rel-16 solution this is not a problem as the SN is also be node generating the CPC configuration. Therein, the Source SN prepared an RRCReconfiguration* message that is provided to the UE as an SCG RRC reconfiguration, wherein that contains a conditional configuration IE (ConditionalRecon-figuration IE or ConditionalReconfiguration for short) with the target candidates reconfiguration(s), RRCReconfigura-tion** per target candidate, and the SCG measConfig with the CP-related measConfig (containing the measId(s) referred in the ConditionalReconfiguration).

However, in Rel-17 CPC, because the MN needs to be the node generating the CPC configurations, it becomes unclear how the CPC-related measurement configurations will be configured to the UE, as that needs to be determined by SN, but final CPC configuration needs to be generated by the MN.

This could lead to a mismatch between the network and the UE configurations leading to unexpected behaviors, e.g. execution of conditional PSCell Change at a completely wrong point in time, leading to e.g. SCG failure.

Accordingly, in one aspect there is provided a method performed by a UE. The method includes receiving from a MN a first RRC reconfiguration message (RRCReconfigu-ration). The RRCReconfiguration message comprises: i) a second RRC reconfiguration message, RRCReconfigura-tion***, generated by an S-SN, wherein the RRCReconfiguration*** message comprises a measurement configuration; and ii) a conditional reconfiguration IE (e.g., ConditionalReconfiguration IE) generated by the MN, wherein the conditional reconfiguration IE contains at least a first measurement ID that the MN obtained from S-SN, and the first measurement ID is associated with the measurement configuration.

In another aspect there is provided a computer program comprising instructions which when executed by processing circuitry of a UE causes the network node to perform any of the UE methods disclosed herein. In one embodiment, there is provided a carrier containing the computer program wherein the carrier is one of an electronic signal, an optical signal, a radio signal, and a computer readable storage medium.

In another aspect there is provided a UE that is configured to perform any of the UE disclosed herein. The UE may include memory and processing circuitry coupled to the memory.

In another aspect, there is provided a method performed by a master node (MN). The method includes the MN receiving from a source secondary node (S-SN), a message that comprises at least a first measurement ID and ii) a first RRC reconfiguration message (RRCReconfiguration*) that comprises a measurement configuration. The method also includes the MN transmitting to a UE a second RRC reconfiguration message (RRCReconfiguration). The RRCReconfiguration message transmitted to the UE comprises i) the RRCReconfiguration* message and ii) a conditional reconfiguration IE generated by the MN, wherein the conditional reconfiguration IE contains the first measurement ID that the MN received from S-SN.

In another aspect, there is provided a method performed by a S-SN. The method includes the S-SN transmitting to an MN a message associated with a UE. The message comprises i) at least a first measurement ID, and ii) a first radio resource control, RRC, reconfiguration message (RRCReconfiguration*) that comprises a measurement configuration. The method also includes the S-SN receiving an RRC reconfiguration complete message corresponding to the RRCReconfiguration* message, wherein the RRC reconfiguration complete message was transmitted to the MN by the UE and relayed by the MN to the S-SN.

In another aspect there is provided a computer program comprising instructions which when executed by processing circuitry of a network node causes the network node to perform any of the network node methods disclosed herein. In one embodiment, there is provided a carrier containing the computer program wherein the carrier is one of an electronic signal, an optical signal, a radio signal, and a computer readable storage medium.

In another aspect there is provided a network node that is configured to perform any of the network methods disclosed herein. The network node may include memory and processing circuitry coupled to the memory.

An advantage provided by the embodiment disclosed herein is that they avoid misalignment between the network and the UE regarding which measConfig to use when monitoring conditions for conditional reconfiguration. Hence, unexpected behavior and failure scenarios can be avoided.

8

Figure 5:
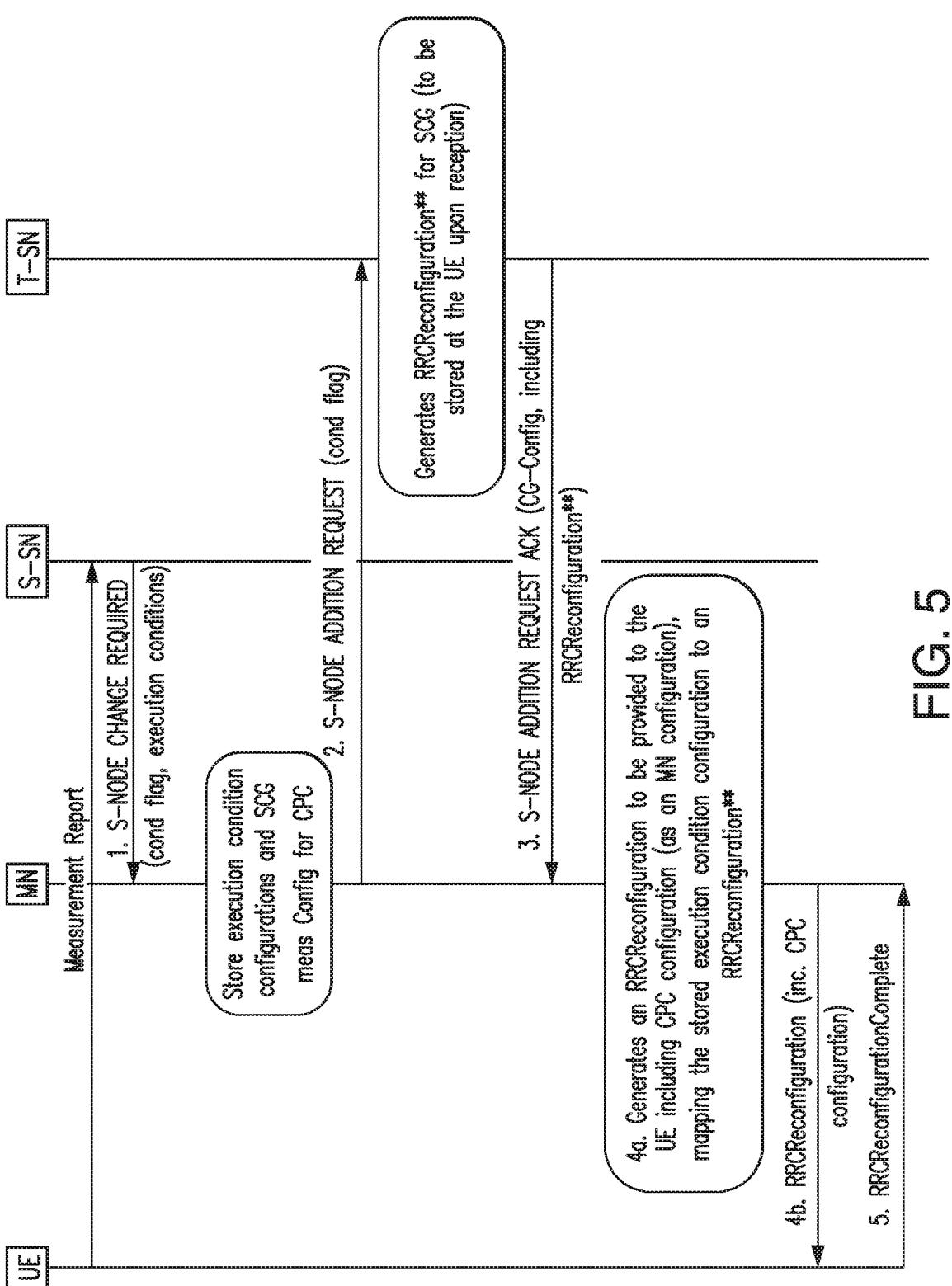

FIG. 5 is a message flow diagram according to an embodiment.

Figure 6:
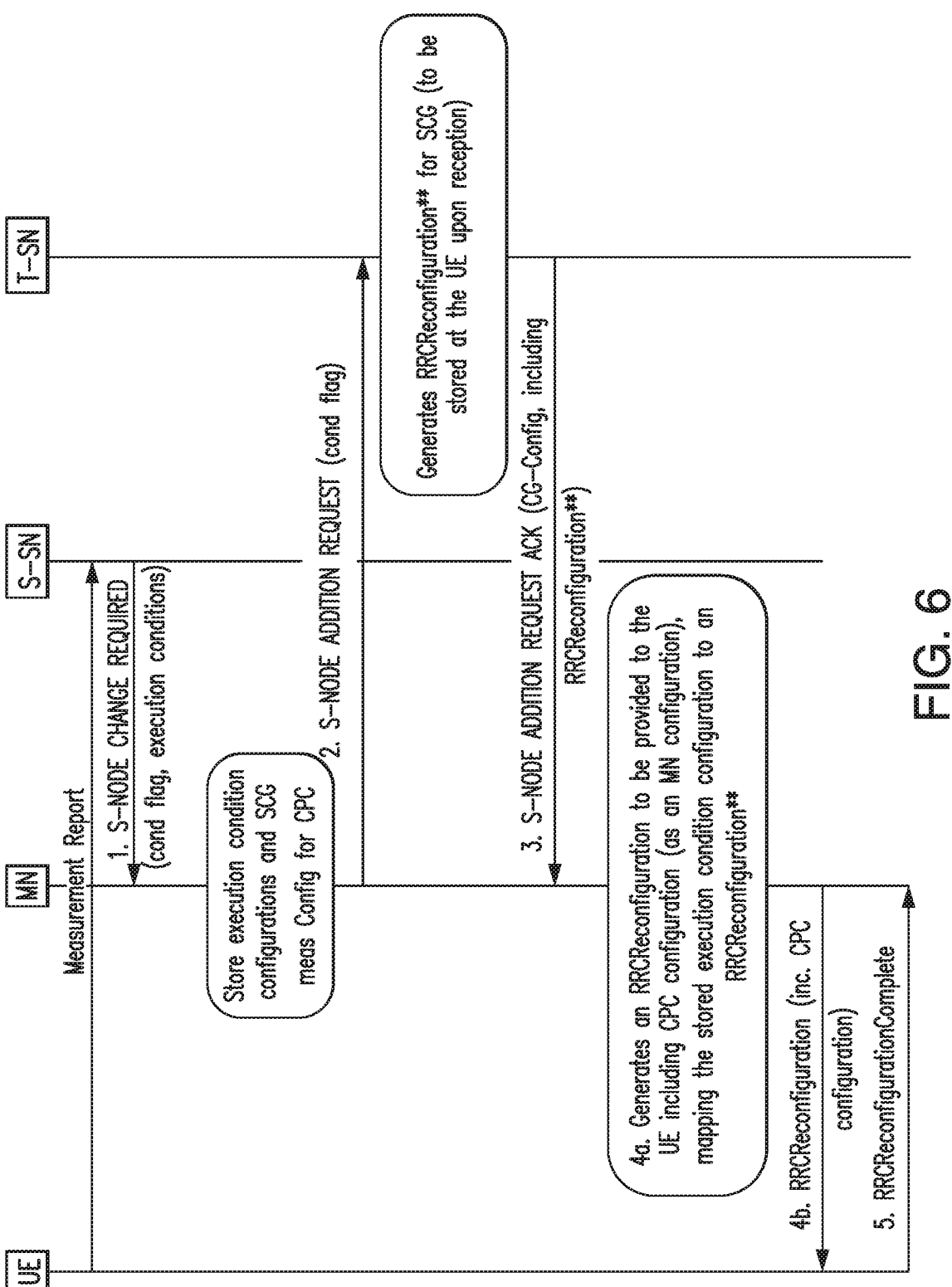

FIG. 6 is a message flow diagram according to an embodiment.

FIG. 7 is a flowchart illustrating a process according to an embodiment.

Figure 8:
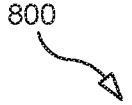

FIG. 8 is a flowchart illustrating a process according to an embodiment.

FIG. 9 is a flowchart illustrating a process according to an embodiment.

Figure 10:
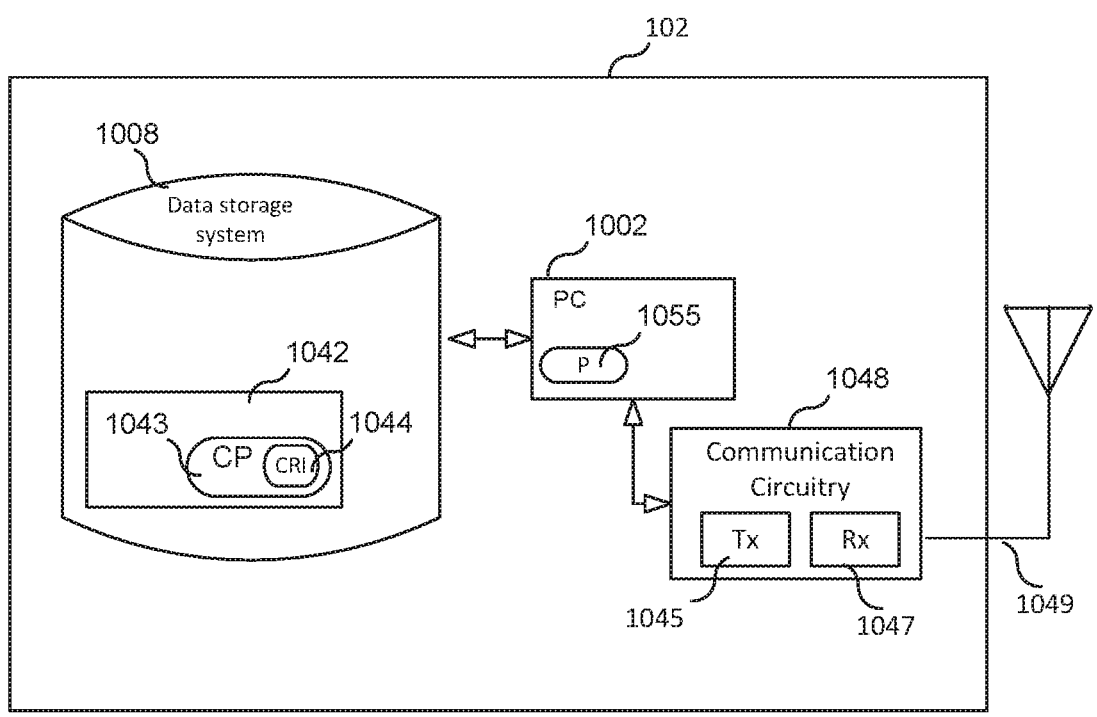

FIG. 10 is a block diagram of a UE according to an embodiment.

Figure 11:
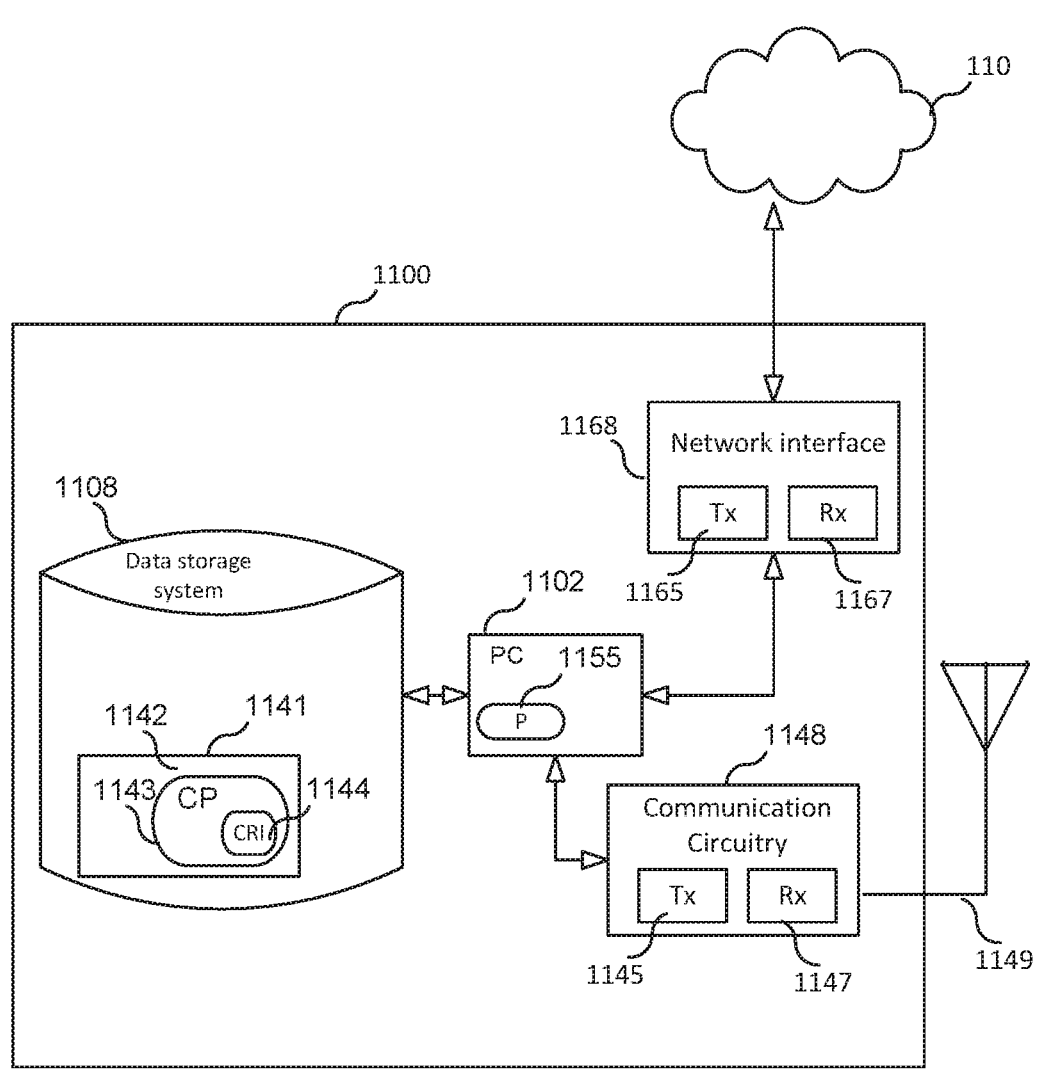

FIG. 11 is a block diagram of a network node according to an embodiment.

Figure 12:
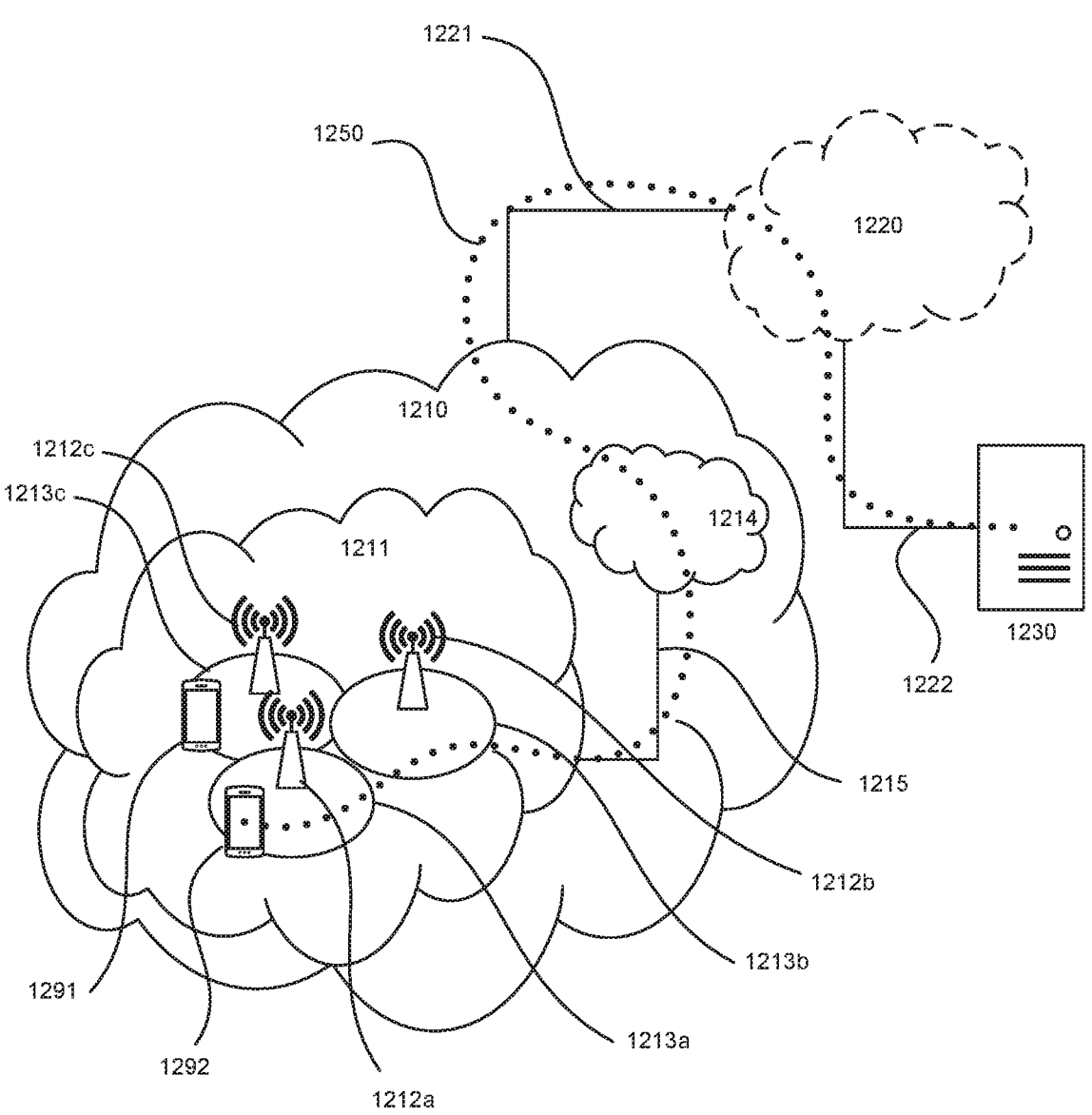

FIG. 12 illustrates a system according to an embodiment.

Figure 13:
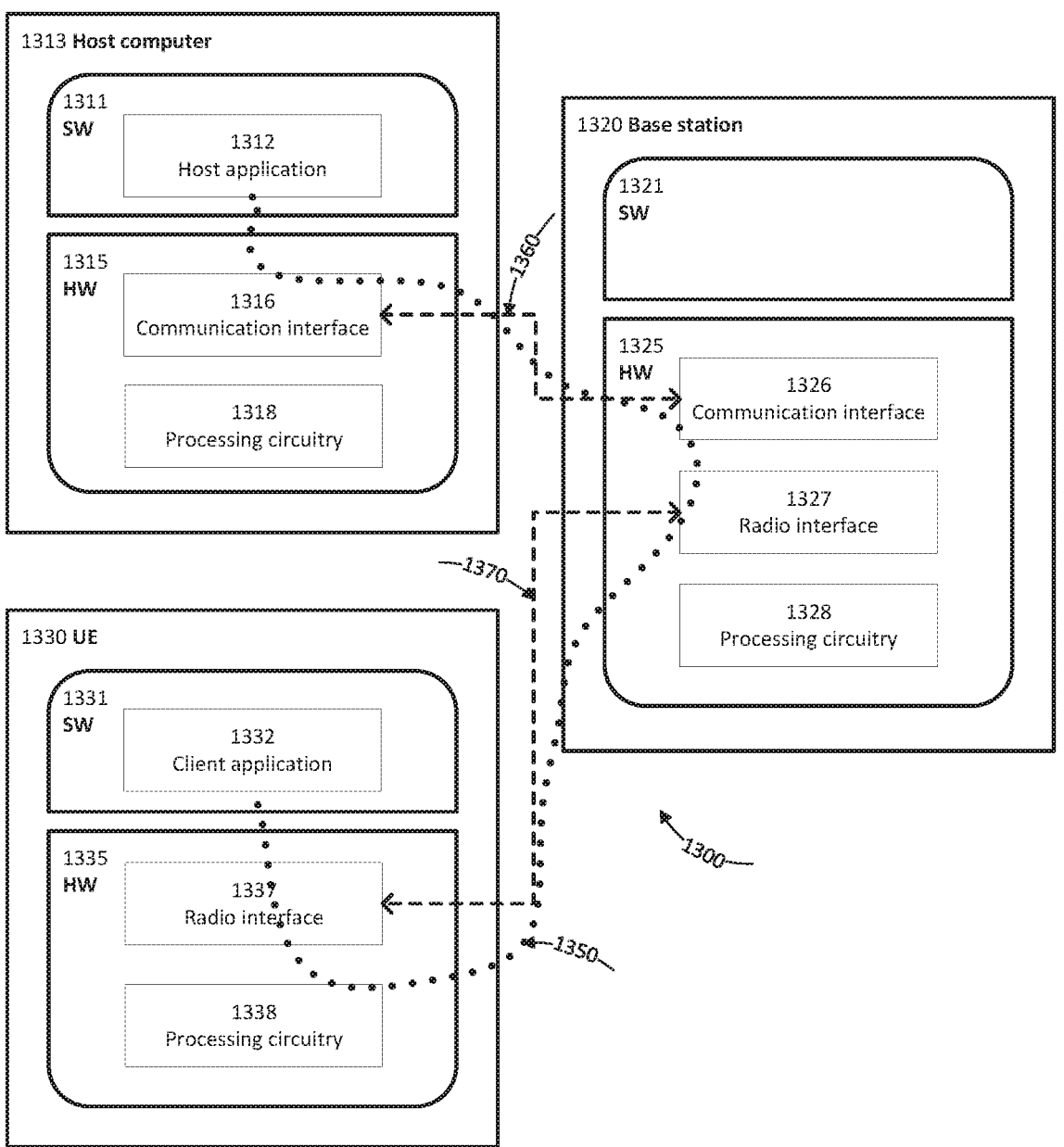

FIG. 13 illustrates a host computer communicating via a base station with a user equipment over a partially wireless connection in accordance with an embodiment.

Figure 14:
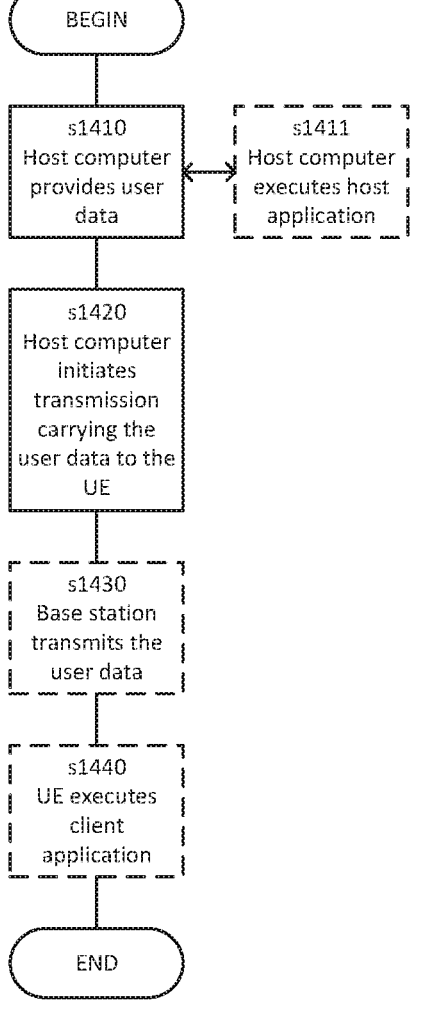

FIG. 14 is a flowchart illustrating a process according to an embodiment.

Figure 15:
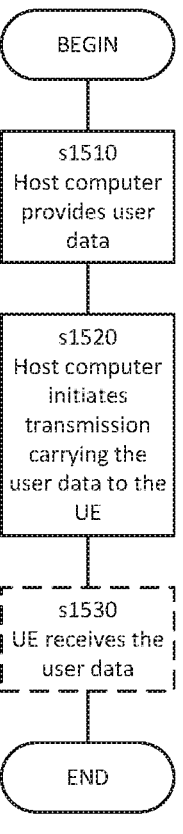

FIG. 15 is a flowchart illustrating a process according to an embodiment.

FIG. 16 is a flowchart illustrating a process according to an embodiment.

FIG. 17 is a flowchart illustrating a process according to an embodiment.

DETAILED DESCRIPTION

Certain aspects of the present disclosure and their embodiments may provide solutions to the above described challenges. For example, this disclosure describes different ways to solve the problem with different measConfig at conditional reconfiguration and how to avoid any misalignment regarding which measConfig to use when monitoring conditions.

In one approach, the UE determines if Conditional Reconfiguration is for CPC in the message of MN format, e.g., inter-SN CPC. The UE determines by check if the SCG configuration in the message to be applied upon execution (in MN format) contains an SCG reconfiguration with sync (for PSCell Change). Upon determining that, the UE determines the CPC-related MeasConfig by looking at the SCG MeasConfig.

In another approach, the UE checks both MN/MCG measConfig and SN/SCG measConfig to determine which one contains the CPC-related MeasConfig. That works fine in case the UE cannot be configured simultaneously with CHO and CPC i.e. for a ConditionalReconfiguration within a message in MN format there is either an SCG MeasConfig with the related CPC measConfig, or an MCG MeaConfig with the related CHO measConfig.

In another approach, the UE relies on an indication, i.e., the network includes an explicit indication in the CPC configuration and/or in the RRCReconfiguration message (in MN format) configuring CPC indicating that the UE shall use the SCG MeasConfig for the CPC-related configuration.

In another approach, a network-based solution is provided. In an MN-translation example, the Source SN generates a CPC-related MeasConfig that can be interpreted by the MN and includes in the message from the S-SN to the MN, so that the MN can generate a CPC configuration and the CPC-related measConfig in MN format.

In an SN-translation example, the Source SN generates a CPC-related MeasConfig that is in MN format and includes in the message from the S-SN to the MN, so that the MN can generate a CPC configuration and the CPC-related measConfig in MN format can just be added, i.e., the MN may not require further processing of what the S-SN provides to it.

Additional Details

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

This disclosure refers to a first network node operating as a Master Node (MN), e.g. having a Master Cell Group (MCG) configured to the UE and/or an MN-terminated bearer; that MN can be a gNodeB (NR base station), or a Central Unit gNodeB (CU-gNB) or an eNodeB (LTE base station), or a Central Unit eNodeB (CU-gNB), or any network node and/or network function. This disclosure also refers to a second network node operating as a Secondary Node (SN), or Source Secondary Node (S-SN) e.g. having a Secondary Cell Group (SCG) pre-configured (i.e. not connected to) to the UE; that SN can be a gNodeB, or a Central Unit gNodeB (CU-gNB) or an eNodeB, or a Central Unit eNodeB (CU-gNB), or any network node and/or network function. The MN, S-SN, and T-SN may be from the same or different Radio Access Technologies (and possibly be associated to different Core Network nodes).

The text below refers to a "Secondary Node (SN)", or target SN. This is equivalent to say this is a target candidate SN, or a network node associated to a target candidate PSCell that is being configured.

The text below refers to a "Master Node (MN)". This is equivalent to say this is a MN to be, or a network node that has configured a UE connected to it with CPA. The term "to be" refers to the fact that when CPA is prepared the UE is not yet operating in MR-DC, so strictly speaking one might say this is not yet operating as a MN in the same ways as in legacy MR-DC, since the UE is still in single connectivity until it executes CPA.

stored, with an execution condition, wherein the UE only applies the message upon the fulfillment of the execution condition. That candidate SN is associated to one or multiple PSCell candidate cell(s) that the UE can be configured with. The UE then can execute the condition and accesses one of these candidate cells, associated to a candidate SN that becomes the SN or simply the SN after execution (i.e. upon fulfillment of the execution condition).

The text below may refer to a Conditional PSCell Addition (CPA) configuration and procedures (like CPA execution) to refer to the procedure from the UE perspective. Other terms may be considered as synonyms such as conditional reconfiguration, or Conditional Configuration (since the message that is stored and applied upon fulfillment of a condition is an RRCReconfiguration or RRCConnectionReconfiguration). Terminology wise, one could also interpret conditional handover (CHO) in a broader sense, also covering CPA (Conditional PSCell Addition) procedures. The document refers to a Conditional SN Addition most of the time to refer to the procedure from the UE perspective, to refer to procedures between network nodes wherein a node requests a target candidate SN to configure a conditional PSCell Addition (CPA) for at least one of its associated cells (cell associated to the target candidate SN).

The text below refers to CPAC as a way to refer to either a Conditional PSCell Addition (CPA) or a Conditional PSCell Change (CPC).

The configuration of CPA can be done using the same IEs as conditional handover, which may be called at some point conditional configuration or conditional reconfiguration. The principle for the configuration is the same with configuring triggering/execution condition(s) and a reconfiguration message to be applied when the triggering condition(s) are fulfilled. The configuration IEs from 3GPP TS 38.331 V16.6.0 (hereafter "TS 38.331") are shown and described below:

The ConditionalReconfiguration IE, shown in table below, is used to add, modify and release the configuration of conditional configuration.

```
ConditionalReconfiguration-r16 ::=        SEQUENCE {
attemptCcondReconfig-r16                  ENUMERATED {true}          OPTIONAL,
-- Need N
condConfigToRemoveList-r16                CondConfigToRemoveList-r16  OPTIONAL, --
Need N
condConfigToAddModList-r16                CondConfigToAddModList-r16  OPTIONAL, -
- Need N
...
}
CondConfigToRemoveList-r16 ::=            SEQUENCE (SIZE (1.. maxNrofCondCells))
OF CondConfigId-r16
ConditionalReconfiguration field descriptions:
condConfigToAddModList: List of the configuration of candidate SpCells to be added or
modified for CHO or CPC.
condConfigToRemoveList: List of the configuration of candidate SpCells to be removed.
When the network removes the stored conditional configuration for a candidate cell, the
network releases the measIDs associated to the condExecutionCond if it is not used by the
condExecutionCond of other candidate cells.
```

"MN generated CPA" corresponds to a procedure wherein the node connected to the UE in single connectivity (to become a Master Node—MN upon CPA execution) determines to configure conditional PSCell Addition (CPA).

The text below refers to a candidate SN, or SN candidate, or an SN, as the network node (e.g. gNodeB) that is prepared during the CPA procedure and that can create an RRC Reconfiguration message with an SCG configuration (e.g. RRCReconfiguration**) to be provided to the UE and The CondConfigId IE, which is shown in the table below, is used to identify a CHO or CPC configuration.

```
CondConfigId-r16 ::=      INTEGER (1.. maxNrofCond-Cells)
```

The CondConfigToAddModList IE, which is shown in the table below, concerns a list of conditional configurations to add or modify, with for each entry the cho-ConfigId and the associated condExecutionCond and condRRCReconfig.

```
CondConfigToAddModList-r16 ::=        SEQUENCE (SIZE (1..
maxNrofCondCells)) OF CondConfigToAddMod-r16
CondConfigToAddMod-r16 ::=            SEQUENCE {
condConfigId-r16                     CondConfigId-r16,
condExecutionCond-r16                    SEQUENCE (SIZE (1..2)) OF MeasId
OPTIONAL,   -- Need S
condRRCReconfig-r16                      OCTET STRING (CONTAINING
RRCReconfiguration) OPTIONAL,        -- Need S
...
}
FIELD DESCRIPTIONS:
condExecutionCond: The execution condition that needs to be fulfilled in order to trigger
the execution of a conditional configuration. The field is mandatory present when a
condConfigId is being added. Otherwise, when the condRRCReconfig associated to a
condConfigId is being modified it is optionally present and the UE uses the stored value if
the field is absent.
condRRCReconfig: The RRCReconfiguration message to be applied when the condition(s)
are fulfilled. The field is mandatory present when a condConfigId is being added.
Otherwise, when the condExecutionCond associated to a condConfigId is being modified it
is optionally present and the UE uses the stored value if the field is absent.
```

The text below mentions the term "CPC-related measConfig" or "CPC related measurement configuration" to refer to the measurement configuration (IE MeasConfig) containing the configuration of the measurement identities (measId(s)) associated to a target candidate in the Condi-tionalReconfiguration, wherein the measId is associated to a measurement object and to a reportConfig wherein the reportType is set to condTriggerConfig, as shown below:

```
ReportConfigNR ::=        SEQUENCE {
reportType                CHOICE {
periodical                PeriodicalReportConfig,
eventTriggered                EventTriggerConfig,
...,
reportCGI                 ReportCGI,
reportSFTD                ReportSFTD-NR,
condTriggerConfig-r16          CondTriggerConfig-r16,
cli-Periodical-r16             CLI-PeriodicalReportConfig-r16,
cli-EventTriggered-r16         CLI-EventTriggerConfig-r16
}
}
```

Additional Explanation

This disclosure provides solutions for how to manage a situation where an SN sets conditions for a conditional reconfiguration, but an MN creates the message to the UE comprising the conditional reconfiguration.

This creates a problem in that the CPC is a configuration in MN-format while the SCG MeasConfig containing the CPC MeasConfig is in SN format. And, according the structure of measurement configuration for a UE in MR-DC, the MN/MCG-related measConfig and the SN/SCG-related measConfig are handled independently, as it says in TS 38.331:

```
In NR-DC, the UE may receive two independent measConfig:
  - a measConfig, associated with MCG, that is included in the RRCReconfiguration
message received via SRB1; and
    - a measConfig, associated with SCG, that is included in the RRCReconfiguration
message received via SRB3, or, alternatively, included within a RRCReconfiguration message
embedded in a RRCReconfiguration message received via SRB1.
In this case, the UE maintains two independent VarMeasConfig and VarMeasReportList, one
associated with each measConfig, and independently performs all the procedures in clause 5.5
for each measConfig and the associated VarMeasConfig and VarMeasReportList, unless
explicitly stated otherwise.
```

And, when the text above refers to a "measId included in the measIdList within VarMeasConfig indicated in the con-dExecutionCond associated to condReconfigId" it is refer-ring to the VarMeasConfig associated to the network node where CPC has been configured. In this case, as CPC is configured by the MN (in MN format) the UE looks at the MN/MCG-related VarMeasConfig but the MeasConfig is not there, since the CPC-related measConfig has been received as an SCG MeasConfig.

The consequence is that the UE will not find the CPC-related measConfig in the MN/MCG-related VarMeasConfig and will detect an inability to comply, which will trigger a re-establishment procedure upon CPC configuration, which is not desirable.

Various embodiments are proposed to resolve this issue.

Figure 1:
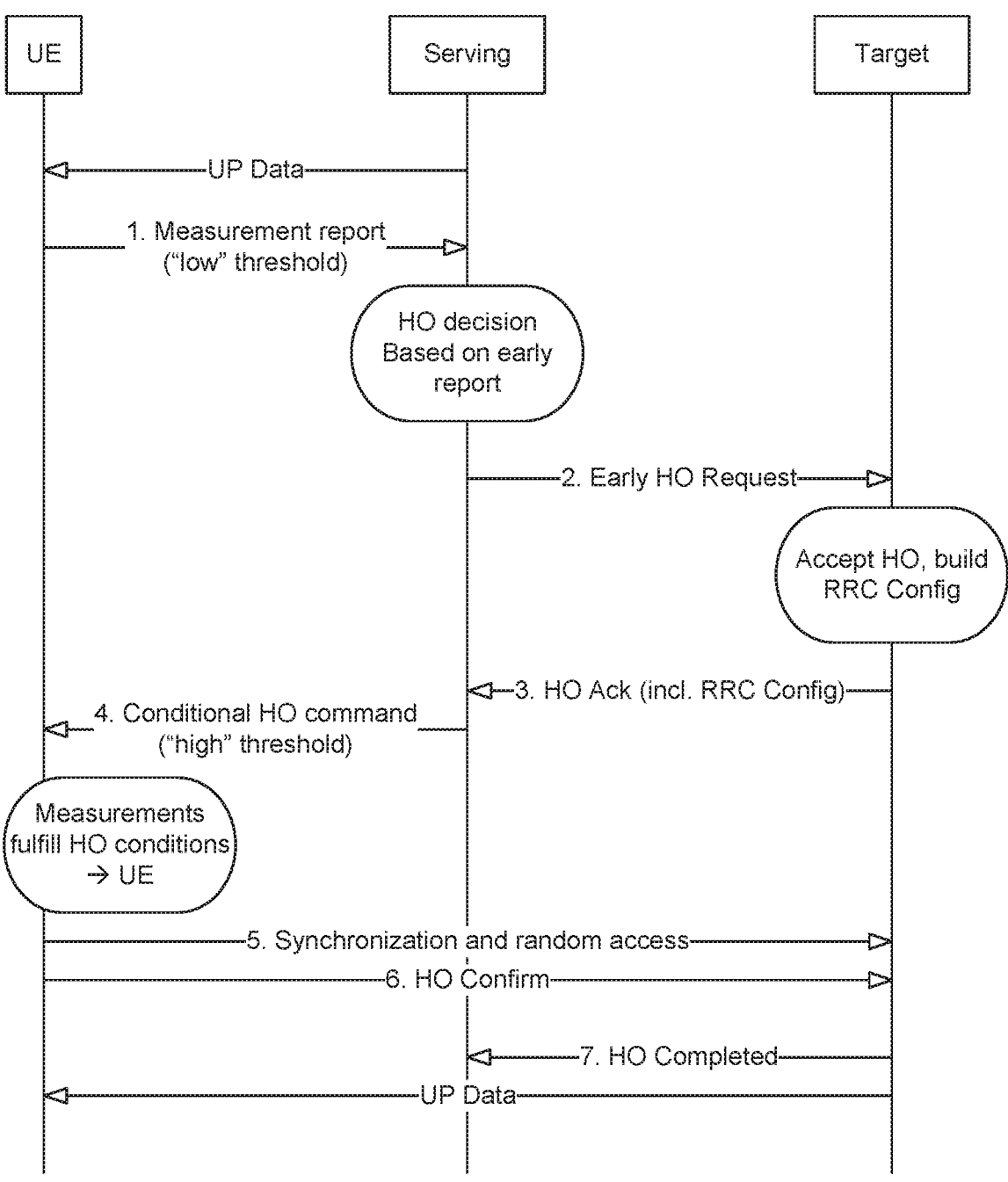
FIGS. 1-3 are a message flow diagrams.
Figure 2:
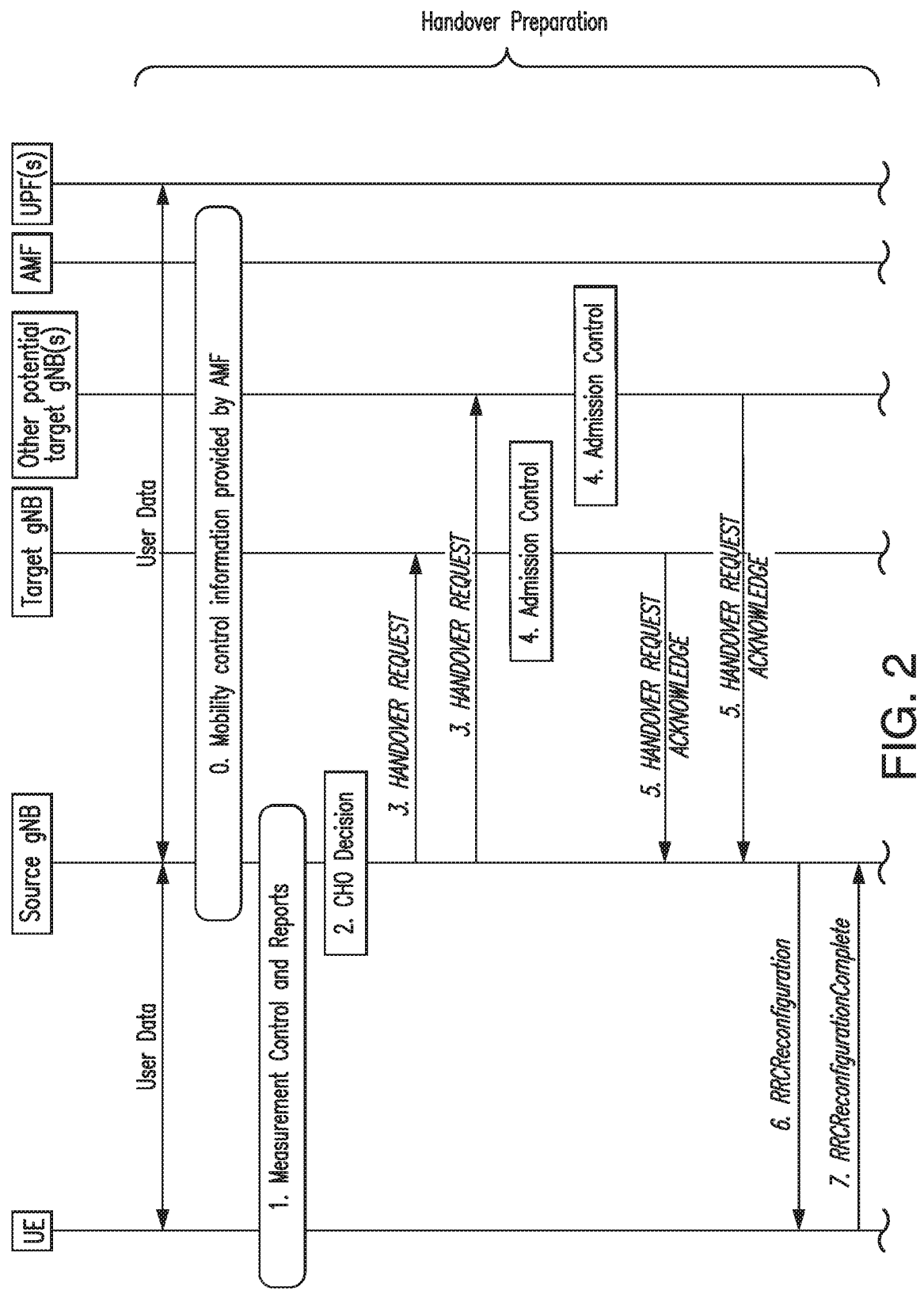
Figure 2:
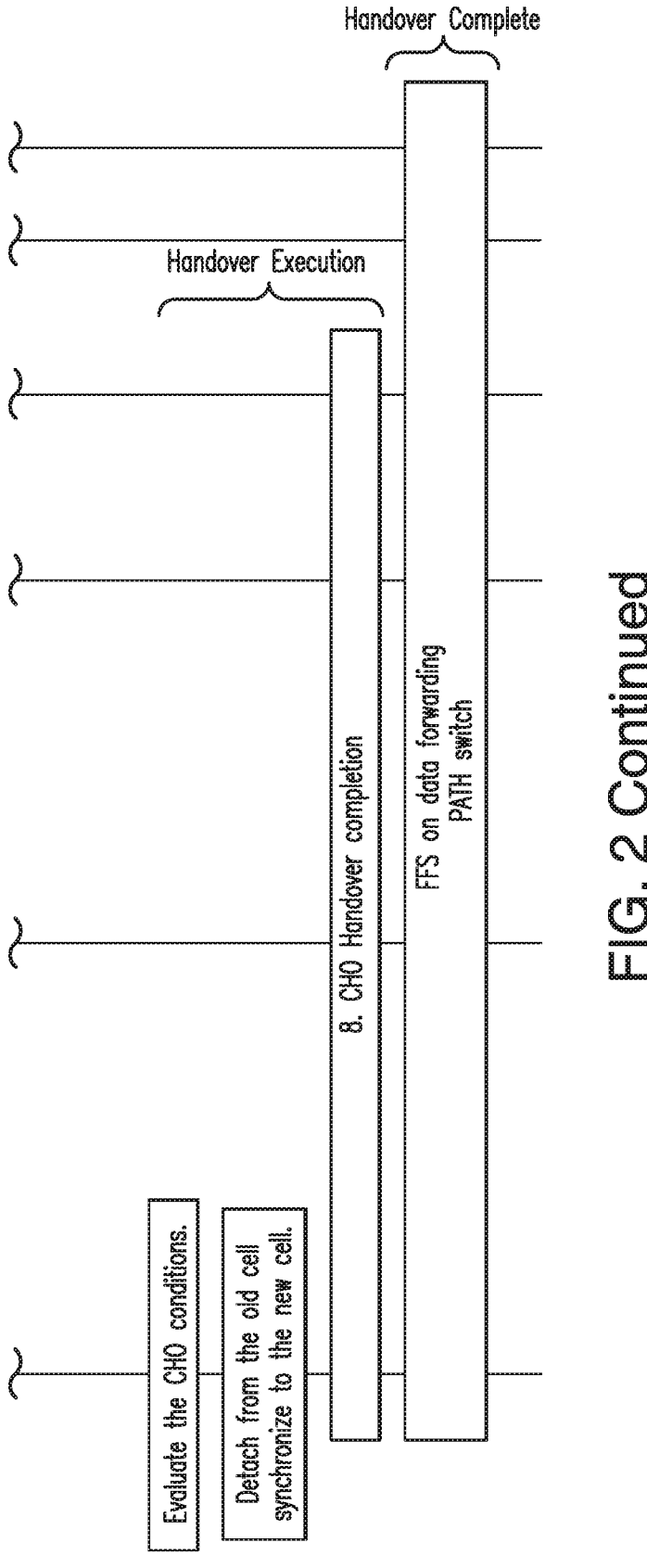
Figure 3:
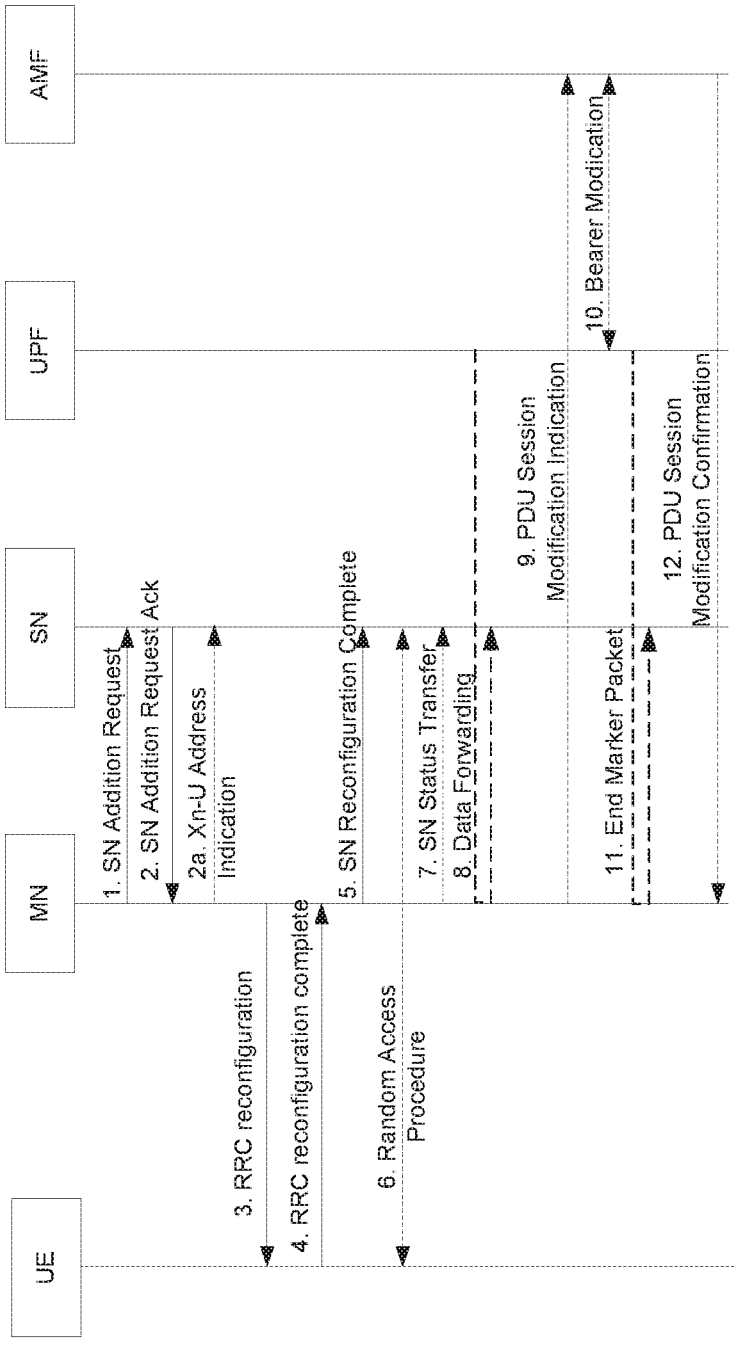
Figure 4:
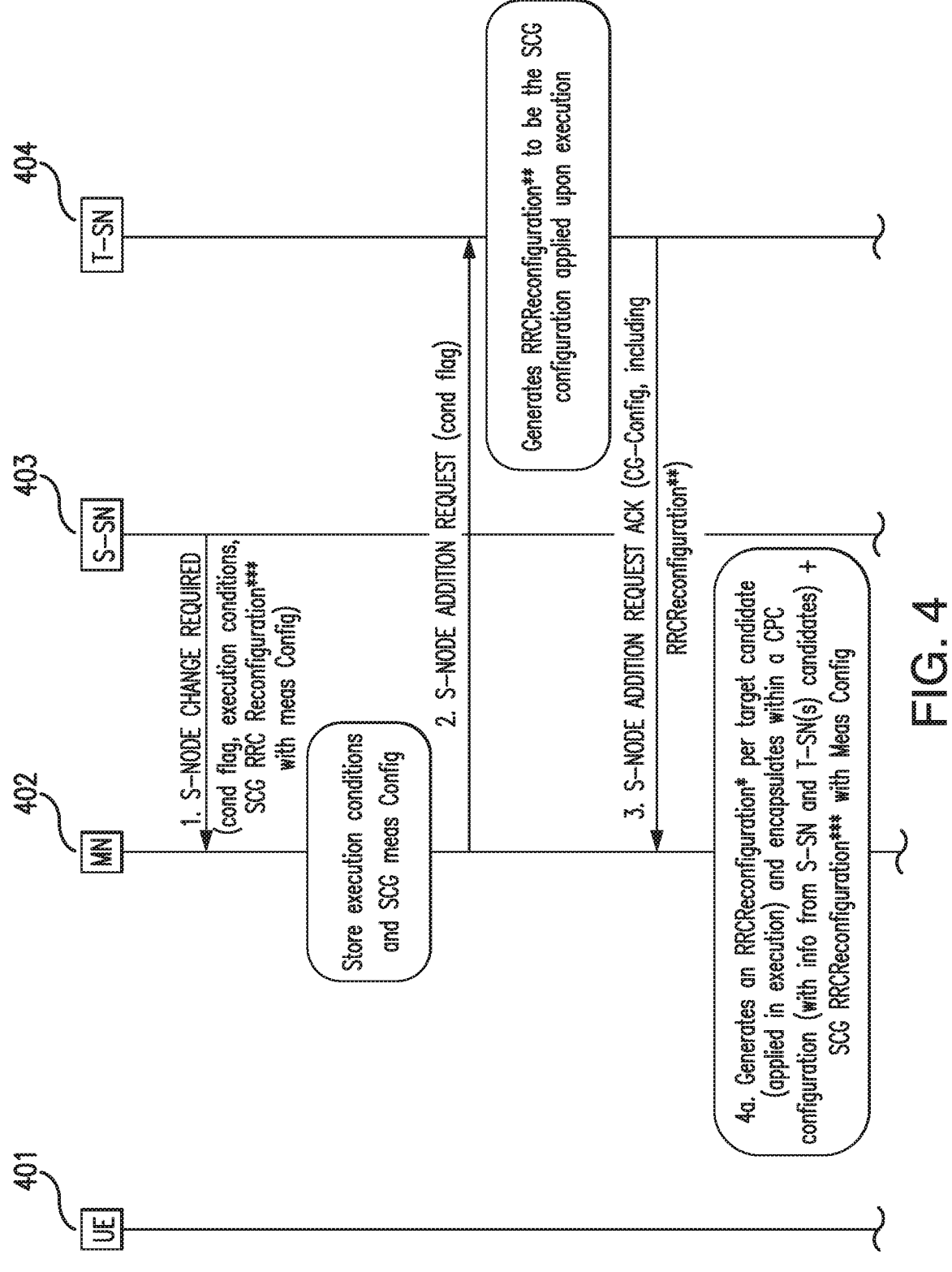
FIG. 4 is a message flow diagram according to an embodiment.
Figure 4:
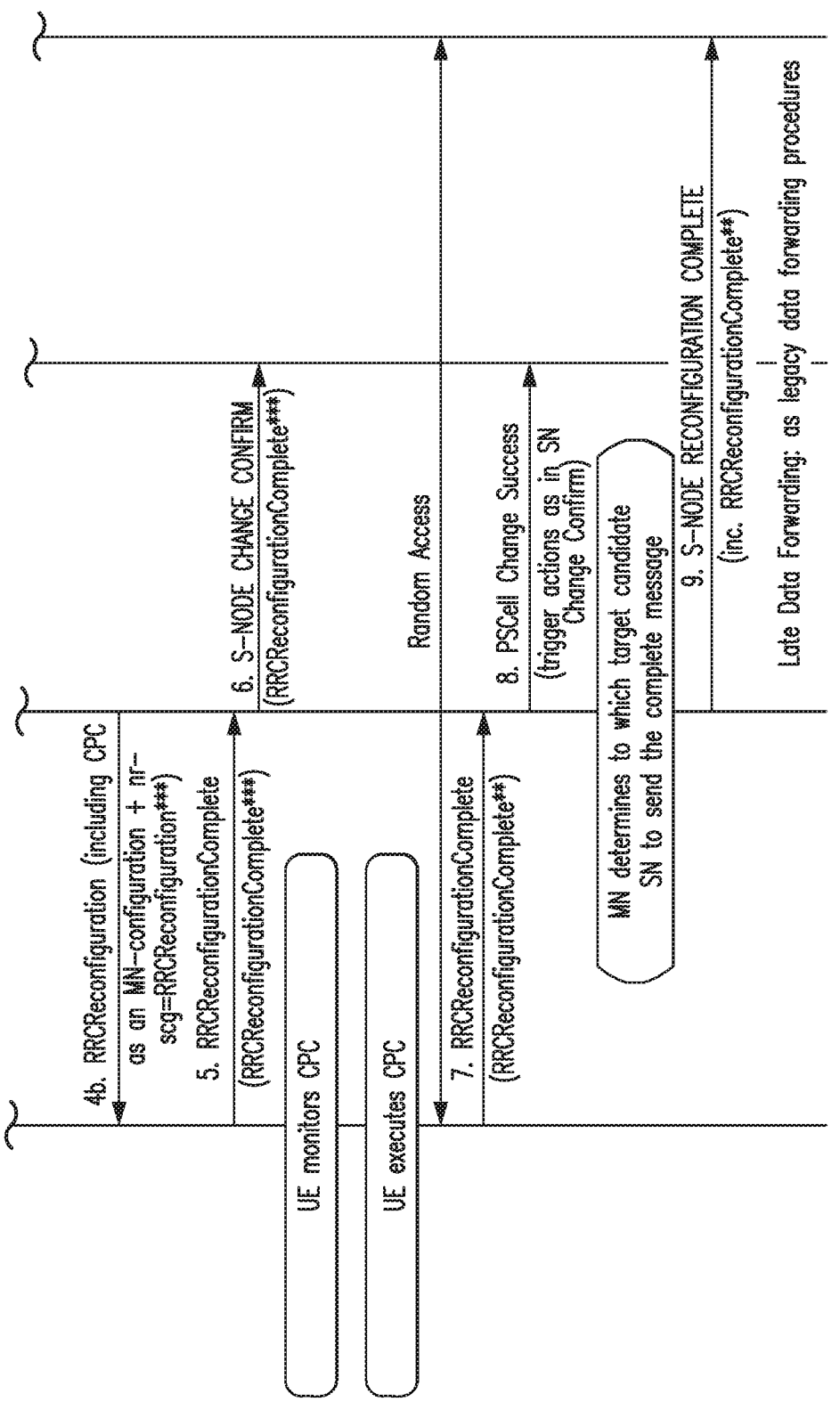

In one embodiment, which is illustrated in FIG. 4, a source SN 403 (S-SN) provides to a MN 402 a CPC-related measConfig in an RRC container, i.e., as an RRCRecon-figuration message, denoted RRCReconfiguration*, con-taining a MeasConfig IE (which is the SCG MeasConfig) with measurement identifier(s) associated to a reportConfig whose the reportType is set to condTriggerConfig. That is, as shown in FIG. 4, S-SN 403 transmits to MN 102 a message (e.g., an S-Node Change Required message) that comprises i) at least a first measurement ID (measID) and ii) a first RRC reconfiguration message (denoted RRCReconfigura-tion*) that comprises a measurement configuration (SCG MeasConfig) associated with the measurement ID.

The S-SN 403 also provides to the MN 402 the mapping between measId(s) and each target cell candidate, so the MN can generate a CPC configuration, i.e., the ConditionalRe-configuration IE. For example, S-SN 403 gives to the MN 402 the measId=1, associated to target candidate PSCell cell-7, and measId=2 AND measId=5 associated to target candidate PSCell cell-5. Then, S-SN also gives to the MN the SCG MeasConfig configures these measId(s) 1, 2 and 5, and their associated reportConfig(s) and measObject(s).

Upon reception, the MN generates the CPC configuration in MN format and provides the RRCReconfiguration*** to the UE with the CPC-related measConfig, and the measId(s) within the CPC configuration (i.e. the ConditionalReconfiguration IE for CPC).

More specifically, as shown in FIG. 4, after MN 402 receives the S-Node Change Required message from S-SN 403, MN 402 transmits to T-SN 404 a S-NODE Addition Request Message. The T-SN responds by sending an acknowledgement message comprising an RRC Reconfiguration message (denoted RRCReconfiguration). After receiving the RRCReconfiguration from T-SN 404, MN 402 generates an RRC Reconfiguration message (denoted RRCReconfiguration*) which contains RRCReconfiguration and then transmits to UE 401 an RRC Reconfiguration message (denoted RRCRconfiguration) that contains the following: a ConditionalReconfiguration IE (i.e., the CPC configuration), RRCReconfiguration* and RRCReconfiguration*, which contains RRCReconfiguration**.

When the UE receives the RRCReconfiguration with i) CPC configuration and ii) the SCG MeasConfig (within the RRCReconfiguration***), as an MN configuration, the UE performs actions indicated in the table below:

ments to detect whether or not a condition indicated in the ConditionalReconfiguration IE (CPC configuration) is satisfied; and as a result of detecting that the condition is satisfied, the UE executes the CPC configuration—i.e., the UE uses information included in the RRCReconfiguration message to perform a random access procedure to establish a connection with the T-SN. After establishing the connection with the T-SN, UE 401 transmits an RRC reconfiguration complete message to MN 402 which includes another RRC reconfiguration complete message (denoted RRCReconfigurationComplete) that is responsive to the RRCReconfiguration message. MN 402 forward RRCRecofigurationComplete to T-SN 404.

In another embodiment, the UE determines if Conditional Reconfiguration is for CPC in the message of MN format, e.g., inter-SN CPC. The UE determines by check if the SCG configuration in the message to be applied upon execution (in MN format) contains an SCG reconfiguration with sync (for PSCell Change). Upon determining that, UE determines the CPC-related MeasConfig by looking at the SCG MeasConfig. Further details are provided below in Section 1.

In another embodiment the, UE checks both MN/MCG measConfig and SN/SCG measConfig to determine which one contains the CPC-related MeasConfig. That works fine in case the UE cannot be configured simultaneously with

| Conditional reconfiguration evaluation |
|---|

The UE shall:
1> for each condReconfigId within the VarConditionalReconfig:
  2> consider the cell which has a physical cell identity matching the value indicated in the ServingCellConfigCommon included in the reconfigurationWithSync in the received condRRCReconfig to be applicable cell;
  2> for each measId included in the measIdList within VarMeasConfig indicated in the condExecutionCond associated to condReconfigId:
    3> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
      4> consider the event associated to that measId to be fulfilled;
    3> if the measId for this event associated with the condReconfigId has been modified; or
    3> if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
      4> consider the event associated to that measId to be not fulfilled;
  2> if event(s) associated to all measId(s) within condTriggerConfig for a target candidate cell within the stored condRRCReconfig are fulfilled:
    3> consider the target candidate cell within the stored condRRCReconfig, associated to that condReconfigId, as a triggered cell;
    3> initiate the conditional reconfiguration execution, as specified in 5.3.5.13.5;
  NOTE: Up to 2 MeasId can be configured for each condReconfigId. The conditional reconfiguration event of the 2 MeasId may have the same or different event conditions, triggering quantity, time to trigger, and triggering threshold.

For example, in response receiving the RRCReconfiguration message transmitted by MN 402, UE 401 transmits to MN 402 an RRC reconfiguration complete message (denoted RRCReconfigurationComplete) that is response to the RRCReconfiguration message, where the RRCReconfigurationComplete message transmitted by UE 401 includes another RRC reconfiguration complete message (this one is denoted RRCRconfigurationComplete*) that is responsive to the RRCReconfiguration* message that was included in the RRCReconfiguration message UE 401 received from MN 402. UE 401 also performs measure- CHO and CPC, i.e., for a ConditionalReconfiguration within a message in MN format there is either an SCG MeasConfig with the related CPC measConfig, or an MCG MeaConfig with the related CHO measConfig. Some further details are provided in Section 2.

In another embodiment, the UE relies on an indication i.e. Network includes an explicit indication in the CPC configuration and/or in the RRCReconfiguration message (in MN format) configuring CPC indicating that the UE shall use the SCG MeasConfig for the CPC-related configuration. Some further details are provided in Section 3.

In another embodiment, there may be Network-based solution, such as:

1. (MN-translation) The Source SN generates a CPC-related MeasConfig that can be interpreted by the MN, and includes in the message from the S-SN to the MN, so that the MN can generate a CPC configuration and the CPC-related measConfig in MN format; and 2. (SN-translation) The Source SN generates a CPC-related MeasConfig that is in MN format, and includes in the message from the S-SN to the MN, so that the MN can generate a CPC configuration and the CPC-related measConfig in MN format can just be added, i.e., the MN may not require further processing of what the S-SN provides to it.

Section 1: UE Determines if CPC is Configured, and Uses SCG MeasConfig

In this option the UE determines if Conditional Reconfiguration is for CPC in the message of MN format, e.g., inter-SN CPC. The UE determines by checking if the SCG configuration in the message to be applied upon execution (in MN format) contains an SCG reconfiguration with sync (for PSCell Change). This is equivalent to determine if inter-SN CPC is configured. Upon determining that, UE determines the CPC-related MeasConfig by looking at the SCG MeasConfig.

According to this option, when the UE receives the RRCReconfiguration with CPC configuration and with the SCG MeasConfig (within the RRCReconfiguration***), as an MN configuration, the UE performs actions as described in the below table:

---

Conditional reconfiguration evaluation

The UE shall:
1> for each condReconfigId within the VarConditionalReconfig:
    2> consider the cell which has a physical cell identity matching the value indicated in the ServingCellConfigCommon included in the reconfigurationWithSync in the received condRRCReconfig to be applicable cell;
    2> for each measId included in the measIdList within VarMeasConfig (associated with the SCG if CPC is configured) indicated in the condExecutionCond associated to condReconfigId:
        3> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
            4> consider the event associated to that measId to be fulfilled;
        3> if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
            4> consider the event associated to that measId to be not fulfilled;
    2> if event(s) associated to all measId(s) within condTriggerConfig for a target candidate cell within the stored condRRCReconfig are fulfilled:
        3> consider the target candidate cell within the stored condRRCReconfig, associated to that condReconfigId, as a triggered cell;
        3> initiate the conditional reconfiguration execution, as specified in 5.3.5.13.5;
NOTE: Up to 2 MeasId can be configured for each condReconfigId. The conditional reconfiguration event of the 2 MeasId may have the same or different event conditions, triggering quantity, time to trigger, and triggering threshold.
NOTE 2: The UE determines if inter-SN CPC is configured by check if the SCG configuration in the message to be applied upon execution (in MN format) contains an SCG reconfiguration with sync (for PSCell Change).

---

Notice that intra-SN CPC is configured in SN format. In that sense, the rule should still work i.e. 2> for each measId included in the measIdList within VarMeasConfig (associated with the SCG if inter-SN CPC is configured) indicated in the condExecutionCond associated to condReconfigId, as in both cases the CPC measConfig is within the SCG MeasConfig.

Section 2: UE Checks Both MN/MCG measConfig and SN/SCG measConfig

In this option, the UE checks both MN/MCG measConfig and SN/SCG measConfig to determine which one contains the CPC-related MeasConfig. That works fine in case the UE cannot be configured simultaneously with CHO and CPC, i.e., for a ConditionalReconfiguration within a message in MN format there is either an SCG MeasConfig with the related CPC measConfig, or an MCG MeaConfig with the related CHO measConfig.

According to this option, when the UE receives the RRCReconfiguration with CPC configuration and with the SCG MeasConfig (within the RRCReconfiguration***), as an MN configuration, the UE performs actions as described in the below table:

---

Conditional reconfiguration evaluation

---

The UE shall:

1> for each condReconfigId within the VarConditionalReconfig:

2> consider the cell which has a physical cell identity matching the value indicated in the ServingCellConfigCommon included in the reconfigurationWithSync in the received condRRCReconfig to be applicable cell;

2> for each measId included in the measIdList within VarMeasConfig (either associated with the SCG or the MCG, the one containing a reportConfig whose reportType is set to condTriggerConfig) indicated in the condExecutionCond associated to condReconfigId:

3> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

4> consider the event associated to that measId to be fulfilled;

3> if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

4> consider the event associated to that measId to be not fulfilled;

2> if event(s) associated to all measId(s) within condTriggerConfig for a target candidate cell within the stored condRRCReconfig are fulfilled:

3> consider the target candidate cell within the stored condRRCReconfig, associated to that condReconfigId, as a triggered cell;

3> initiate the conditional rconfiguration execution, as specified in 5.3.5.13.5;

NOTE:        Up to 2 MeasId can be configured for each condReconfigId. The conditional reconfiguration event of the 2 MeasId may have the same or different event conditions, triggering quantity, time to trigger, and triggering threshold.

NOTE 2:        As the UE cannot be configured with CPC and CHO simultaneously, the measConfig associated to the conditional reconfiguration is either an MCG measConfig or an SCG measConfig (i.e. it cannot be in both UE variables associated to the SCG measConfig and to the MCG measConfig).

---

Section 3: Indication of SCG measConfig to the UE

In another embodiment, it is indicated to the UE whether the conditions are referring to the MCG or the SCG measConfig. The UE has received the SCG measConfig in an SCG reconfiguration and knows the SCG measConfig. In this solution the MN does not need to comprehend the SCG measConfig.

According to this embodiment, as shown in FIG. 5, a method executed by MN 402 may include:

1. Receiving a request (e.g., S-Node Change Required message) from SN 403 to configure CPC. The request comprises a conditional indication and the execution conditions, where the execution conditions comprises the measID to be used for the conditional reconfiguration.

2. Transmitting a request to T-SN 404 to prepare a conditional SN addition (CPC).

3. Receiving from the T-SN a response to the conditional SN addition request confirming that a UE may be accepted unless a canceling message is later received.

4a. Generating RRC message (RRCReconfiguration) to be provided to the UE. The RRC message contains CPC configurations for one or multiple candidate target cells (e.g., ConditionalReconfiguration IE). That is, the RRC message contains the condition(s) that the UE should monitor and the message to be applied when the condition(s) are fulfilled. The RRC message also contains an indication to the UE whether the measConfig is the MCG or the SCG measConfig. The message to be applied consists of a reconfiguration of the current MN configuration and the SN configuration (e.g. an RRCReconfiguration* including as its SCG reconfiguration an RRCReconfiguration**), wherein RRCReconfiguration may contain a first MN/MCG related configuration and wherein RRCReconfiguration* (per target candidate) may contain a second MN/MCG related configuration.

4b. Transmitting the RRC message to the UE.

5. Receiving a message from the UE, e.g. an RRCReconfigurationComplete message, that the condition(s) have been fulfilled and that the UE has performed the conditional PSCell Change.

This embodiment may be implemented in TS 38.331 as shown below:

---

* * * * Example Implementation in TS 38.331 * * * * *

CondReconfigToAddModList

The IE CondReconfigToAddModList concerns a list of conditional reconfigurations to add or modify, with for each entry the condReconfigId and the associated condExecutionCond and condRRCReconfig.

CondReconfigToAddModList information element

CondReconfigToAddModList-r16 ::= SEQUENCE (SIZE (1.. maxNrofCondCells-r16)) OF CondReconfigToAddMod-r16

CondReconfigToAddMod-r16 ::=    SEQUENCE { condReconfigId-r16        CondReconfigId-r16, condExecutionCond-r16      SEQUENCE (SIZE (1..2)) OF MeasId -continued

```
OPTIONAL,   -- Cond condReconfigAdd
condRRCReconfig-r16        OCTET STRING (CONTAINING RRCReconfiguration)
OPTIONAL,   -- Cond condReconfigAdd
...,
[[
scgMeasConfig BOOLEAN
]]
}
              CondReconfigToAddMod field descriptions
condExecutionCond
  - The execution condition that needs to be fulfilled in order to trigger the execution of a
conditional reconfiguration. When configuring 2 triggering events (Meas Ids) for a candidate
cell, network ensures that both refer to the same measObject.
condRRCReconfig
  - The RRCReconfiguration message to be applied when the condition(s) are fulfilled.
The RRCReconfiguration message contained in condRRCReconfig cannot contain the field
conditionalReconfiguration or the field daps-Config.
scgMeasConfig
  - Indicates that the measConfig to be used for the conditional reconfiguration is the
SCG measConfig.
condReconfigAdd
  - The field is mandatory present when a condReconfigId is being added. Otherwise the
field is optional, need M.
* * * * End Example Implementation in TS 38.331 * * * * *
```

Section 4: Translation of SCG measConfig to MCG measConfig in the MN (MN Translation)

In another embodiment, the MN transforms the SCG measConfig into an MN format. This could include defining new measConfig in the MN if the MN doesn't have any corresponding measConfig as the SCG. The SCG measConfig can be included in the S-NODE CHANGE REQUIRED when the CPC is initiated.

According to this embodiment, as shown in FIG. 6, a method executed by MN 402 may include:

1. Receiving a request from an SN to configure CPC. The request includes a conditional indication and the execution conditions, where the execution conditions comprises the measID and the measConfig for the SCG.
2. Transmitting a request to T-SN to prepare a conditional SN addition (CPC).
3. Receiving from the T-SN a response to the conditional SN addition request confirming that a UE may be accepted unless a canceling message is later received.
4a. Generating an RRC message, e.g. RRCReconfiguration, containing CPC configurations for one or multiple candidate target cells (e.g. ConditionalReconfiguration IE). The RRC message includes the condition(s) which the UE should monitor and the message to be applied when the condition(s) are fulfilled. The conditions refer to measIDs for measConfig in the MCG. The message may include definition of new MCG measConfig in the MCG, where the MN has translated SCG measConfig into MCG measConfig. The message to be applied consists of a reconfiguration of the current MN configuration and the SN configuration (e.g. an RRCReconfiguration* including as its SCG reconfiguration an RRCReconfiguration**), wherein RRCReconfiguration may contain a first MN/MCG related configuration and wherein RRCReconfiguration* (per target candidate) may contain a second MN/MCG related configuration.
4b. Transmitting the RRC message to UE 401.
5. Receiving a message from the UE, e.g. an RRCReconfigurationComplete message, that the condition(s) have been fulfilled and that the UE has performed the conditional PSCell Change.

Section 5: Creation of SCG measConfig in MN Format (SN Translation)

In this option the Source SN generates a CPC-related MeasConfig that is in MN format, and includes in the message from the S-SN to the MN, so that the MN can generate a CPC configuration and the CPC-related measConfig in MN format can just be added, i.e., the MN may not require further processing of what the S-SN provides to it.

FIG. 7 is a flowchart illustrating a process 700 performed by UE 401. Process 700 may begin in step s702. Step s702 comprises UE 401 receiving from MN 402, a first RRC reconfiguration message (RRCReconfiguration). The RRCReconfiguration message comprises a second RRC reconfiguration message (RRCReconfiguration*) generated by S-SN 403. The RRCReconfiguration* message comprises a measurement configuration. The RRCReconfiguration message also includes a conditional reconfiguration IE (e.g., ConditionalReconfiguration IE) generated by the MN, wherein the conditional reconfiguration IE contains at least a first measurement ID that the MN obtained from S-SN, and the first measurement ID is associated with the measurement configuration.

In some embodiments, the RRCReconfiguration message further comprises a third RRC reconfiguration message (RRCReconfiguration) generated by T-SN 404**.

In some embodiments, the RRCReconfiguration message further comprises a fourth RRC reconfiguration message (RRCReconfiguration*). The RRCReconfiguration* message comprises the RRCReconfiguration** message.

In some embodiments, the first measurement ID is also associated with a report configuration having a report type indicating that the report configuration is a conditional report configuration (e.g., report type is set to condTriggerConfig).

In some embodiments, process 700 also includes step s704, which comprises UE 401 detects that a condition indicated in the conditional reconfiguration IE is satisfied and step s706, which comprises UE 401, as a result of detecting that the condition is satisfied, using information included in the RRCReconfiguration message to perform a random access procedure to establish a connection with the T-SN. In some embodiments, process 700** also includes UE

401, after performing the random access procedure, transmitting to the MN a first RRC complete message comprising a second RRC complete message responsive to the RRCReconfiguration** message.

In some embodiments, process 700 also includes UE 401, in response to the RRCReconfiguration message, transmitting to the MN an RRC reconfiguration complete message responsive to the RRCReconfiguration*** message.

In some embodiments, transmitting the RRC reconfiguration complete message responsive to the RRCReconfiguration* message comprises: generating an RRC reconfiguration complete message responsive to the RRReconfiguration message, wherein the RRC reconfiguration complete message responsive to the RRReconfiguration message comprises the RRC reconfiguration complete message responsive to the RRCReconfiguration* message; and transmitting to the MN the RRC reconfiguration complete message responsive to the RRReconfiguration message.

In some embodiments, the RRCReconfiguration* message further comprises the report configuration. In some embodiments, the RRCReconfiguration* message further comprises the first measurement ID.

FIG. 8 is a flowchart illustrating a process 800 performed by MN 402. Process 800 may begin in step s802. Step s802 comprises MN 402 receiving from a S-SN 403 a message that comprises: i) at least a first measurement ID and ii) a first RRC reconfiguration message (RRCReconfiguration*) that comprises a measurement configuration. Step s804 comprises MN 402 transmitting to UE 401 a second RRC reconfiguration message (RRCReconfiguration). The RRCReconfiguration message transmitted to the UE comprises: i) the RRCReconfiguration* message, and ii) a conditional reconfiguration information element, IE, generated by the MN, wherein the conditional reconfiguration IE contains the first measurement ID that the MN received from S-SN.

In some embodiments process 800 also includes: MN 402, after receiving the message from the S-SN, transmitting a request message to a T-SN 404; and MN 402 receiving from the T-SN an ACK message acknowledging receipt of the request message, were the ACK message comprises a third RRC reconfiguration message (RRCReconfiguration). The RRCReconfiguration message transmitted to the UE further comprises the RRCReconfiguration message.

In some embodiments process 800 also includes MN generating a fourth RRC reconfiguration message (RRCReconfiguration*), wherein the RRCReconfiguration message transmitted to the UE comprises the RRCReconfiguration* message, and the RRCReconfiguration* message includes the RRCReconfiguration** message.

FIG. 9 is a flowchart illustrating a process 900 performed by S-SN 403. Process 900 may begin in step s902. Step s902 comprises S-SN 403 transmitting to MN 402 a message associated with UE 401. The message comprises i) at least a first measurement ID, and ii) a first radio resource control, RRC, reconfiguration message (RRCReconfiguration*) that comprises a measurement configuration. Step s904 comprises S-SN receiving an RRC reconfiguration complete message corresponding to the RRCReconfiguration* message, wherein the RRC reconfiguration complete message was transmitted to the MN by the UE and relayed by the MN to the S-SN.

FIG. 10 is a block diagram of UE 401, according to some embodiments. As shown in FIG. 10, UE 401 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like); communication circuitry 1048, which is coupled to an antenna arrangement 1049 comprising one or more antennas and which comprises a transmitter (Tx) 1045 and a receiver (Rx) 1047 for enabling UE 401 to transmit data and receive data (e.g., wirelessly transmit/receive data); and a storage unit (a.k.a., "data storage system") 1008, which may include one or more non-volatile storage devices and/or one or more volatile storage devices. In embodiments where PC 1002 includes a programmable processor, a computer readable medium (CRM) QQ342 may be provided. CRM QQ342 stores a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes UE 401 to perform steps described herein (e.g., steps described herein with reference to the flow charts). In other embodiments, UE 401 may be configured to perform steps described herein without the need for code. That is, for example, PC 1002 may consist merely of one or more ASICs. Hence, the features of the embodiments described herein may be implemented in hardware and/or software.

FIG. 11 is a block diagram of a network node 1100 (e.g., a base station or a component of a base station), according to some embodiments, for performing the methods disclosed herein. That is network node may implement MN 402, S-SN 403, or T-SN 404. As shown in FIG. 11, network node 1100 may comprise: processing circuitry (PC) 1102, which may include one or more processors (P) 1155 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node may be a distributed computing apparatus); a network interface 1168 comprising a transmitter (Tx) 1165 and a receiver (Rx) 1167 for enabling network node 1100 to transmit data to and receive data from other nodes connected to a network 110 (e.g., an Internet Protocol (IP) network) to which network interface 1168 is connected; communication circuitry 1148 (e.g., radio transceiver circuitry comprising an Rx 1147 and a Tx 1145) coupled to an antenna system 1149 for wireless communication with UEs or other nodes); and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes network node 1100 to perform steps described herein (e.g., steps described herein with reference to one or more flow charts). In other embodiments, network node 1100 may be configured to perform steps described herein without the need for code. That is, for example, PC 1102 may consist merely of one or more ASICs. Hence, the features of the embodiments described herein may be implemented in hardware and/or software.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve one or more of the date rate, latency, and power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

SUMMARY OF ADDITIONAL EMBODIMENTS

Group A Embodiments—UE

A method performed by a UE for addressing measConfig, the method comprising: receiving an RRCReconfiguration message; checking the RRCReconfiguration message and determining that the RRCReconfiguration message includes Conditional Reconfiguration for CPC in Master Node format; in response to determining that the RRCReconfiguration message includes Conditional Reconfiguration for CPC in Master Node format, determining the CPC-related MeasConfig by looking at an SCG MeasConfig in the RRC Reconfiguration message.

The method of the previous embodiment, wherein determining that the RRC Reconfiguration message includes Conditional Reconfiguration for CPC in Master Node format comprises determining that the RRCReconfiguration message includes contains an SCG reconfiguration with sync.

A method performed by a UE for addressing measConfig, the method comprising: receiving an RRCReconfiguration message having an associated MN/MCG measConfig and an SN/SCG measConfig; and checking both the MN/MCG measConfig and an SN/SCG measConfig to determine which one contains the CPC-related MeasConfig.

The method of the previous embodiment, and further comprising, determining the CPC-related MeasConfig by looking at an SCG MeasConfig in the RRC Reconfiguration message.

Group B Embodiments—Base Station

A method performed by a base station acting as a master node for addressing different measConfig, the method comprising: transmitting an RRC message to a UE containing CPC configurations for one or more candidate target cells, the RRC message indicating to the UE a format of a measConfig message within the RRC message.

A method performed by a base station acting as a master node for addressing different measConfig, the method comprising: transmitting an RRC message to a UE containing CPC configurations for one or more candidate target cells, the RRC message indicating to the UE whether a measConfig in the RRC message is a MCG measConfig or an SCG measConfig.

A method performed by a base station acting as a master node for addressing different measConfig, the method comprising: receiving a request to configure CPC; transmitting a request to a Secondary Node (SN) to prepare a conditional SN addition; receiving from the SN a response to the conditional SN addition request confirming that a UE may be accepted unless a canceling message is later received; transmitting an RRC message to a UE containing CPC configurations for one or more candidate target cells, the RRC message indicating to the UE whether a measConfig in the RRC message is a MCG measConfig or an SCG measConfig; receiving a message from the UE that the conditions have been fulfilled and that the UE has performed the conditional PSCell Change.

The method of any previous embodiment, wherein the RRC message further includes one or more conditions that the UE should monitor and any associated message to be applied when any associated conditions are fulfilled.

The method of any previous embodiment, wherein the RRC message is an RRCRconfiguration message.

The method of any previous embodiment wherein the RRC message includes a reconfiguration of a current MN configuration and an SN configuration.

The method of the previous embodiment, wherein the reconfiguration of a current MN configuration and an SN configuration includes an RRCReconfiguration* including as its SCG reconfiguration an RRCReconfiguration**), wherein RRCReconfiguration includes a first MN/MCG related configuration and wherein RRCReconfiguration* per target candidate includes a second MN/MCG related configuration.

The method of any of the previous six embodiments, wherein the message received from the UE is an RRCReconfigurationComplete message.

A method performed by a base station acting as a master node (MN) for addressing different measConfig, the method comprising: transmitting an RRC message to a UE containing CPC configurations for one or more candidate target cells, the RRC message including a translation of measConfig into a format understandable by the MN.

A method performed by a base station acting as a master node (MN) for addressing different measConfig, the method comprising: transmitting an RRC message to a UE containing CPC configurations for one or more candidate target cells, the RRC message including a definition of an associated Master Cell Group (MCG) measConfig on the MCG, where the MN has translated Secondary Cell Group (SCG) measConfig into MCG measConfig.

The method of any of the previous two embodiments, and further comprising the MN performing the translation.

A method performed by a base station acting as a master node (MN) for addressing different measConfig, the method comprising: receiving a request to configure CPC; transmitting a request to a Secondary Node (SN) to prepare a conditional SN addition; receiving from the SN a response to the conditional SN addition request confirming that a UE may be accepted unless a canceling message is later received; transmitting an RRC message to a UE containing CPC configurations for one or more candidate target cells, the RRC message including a definition of an associated Master Cell Group (MCG) measConfig on the MCG, where the MN has translated Secondary Cell Group (SCG) measConfig into MCG measConfig; and receiving a message from the UE that the conditions have been fulfilled and that the US has performed the conditional PSCell Change.

The method of any previous embodiment, wherein the RRC message further includes one or more conditions that the UE should monitor and any associated message to be applied when any associated conditions are fulfilled.

The method of the previous embodiment, wherein the one or more conditions comprise measIDs for measConfig in the MCG.

The method of any previous embodiment, wherein the RRC message is an RRCRconfiguration message.

The method of any previous embodiment wherein the RRC message includes a reconfiguration of a current MN configuration and an SN configuration.

The method of the previous embodiment, wherein the reconfiguration of a current MN configuration and an SN configuration includes an RRCReconfiguration* including as its SCG reconfiguration an RRCReconfiguration**), wherein RRCReconfiguration includes a first MN/MCG related configuration and wherein RRCReconfiguration* per target candidate includes a second MN/MCG related configuration.

The method of any of the previous six embodiments, wherein the message received from the UE is an RRCReconfigurationComplete message.

The method of any of the previous embodiments, further comprising: obtaining user data; and forwarding the user data to a host computer or a UE.

Group C Embodiments

A base station for addressing different measConfig, the base station comprising: processing circuitry configured to perform any of the steps of any of the Group B embodiments; power supply circuitry configured to supply power to the base station.

A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

The communication system of the previous embodiment further including the base station.

The communication system of the previous 2 embodiments, further including the UE, wherein the UE is configured to communicate with the base station.

The communication system of the previous 3 embodiments, wherein: the processing circuitry of the host computer is configured to execute a host application, thereby providing the user data; and the UE comprises processing circuitry configured to execute a client application associated with the host application.

A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

The method of the previous embodiment, further comprising, at the base station, transmitting the user data.

The method of the previous 2 embodiments, wherein the user data is provided at the host computer by executing a host application, the method further comprising, at the UE, executing a client application associated with the host application.

A user equipment (UE) configured to communicate with a base station, the UE comprising a radio interface and processing circuitry configured to performs the of the previous 3 embodiments.

The communication system of the previous embodiment, wherein the cellular network further includes a base station configured to communicate with the UE.

The communication system of the previous 2 embodiments, wherein: the processing circuitry of the host computer is configured to execute a host application, thereby providing the user data; and the UE's processing circuitry is configured to execute a client application associated with the host application.

The method of the previous embodiment, further comprising at the UE, receiving the user data from the base station.

The communication system of the previous embodiment, further including the UE.

The communication system of the previous 2 embodiments, further including the base station, wherein the base station comprises a radio interface configured to communicate with the UE and a communication interface configured to forward to the host computer the user data carried by a transmission from the UE to the base station.

The communication system of the previous 3 embodiments, wherein: the processing circuitry of the host computer is configured to execute a host application; and the UE's processing circuitry is configured to execute a client application associated with the host application, thereby providing the user data.

The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

The method of the previous embodiment, further comprising, at the UE, providing the user data to the base station.

The method of the previous 2 embodiments, further comprising: at the UE, executing a client application, thereby providing the user data to be transmitted; and at the host computer, executing a host application associated with the client application.

The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

The communication system of the previous embodiment further including the base station.

The communication system of the previous 2 embodiments, further including the UE, wherein the UE is configured to communicate with the base station.

The communication system of the previous 3 embodiments, wherein: the processing circuitry of the host computer is configured to execute a host application; the UE is configured to execute a client application associated with the host application, thereby providing the user data to be received by the host computer.

The method of the previous embodiment, further comprising at the base station, receiving the user data from the UE.

The method of the previous 2 embodiments, further comprising at the base station, initiating a transmission of the received user data to the host computer.

A UE for addressing measConfig, the UE comprising: processing circuitry configured to perform any of the steps of any of the Group A embodiments; and power supply circuitry configured to supply power to the UE.

A user equipment (UE) for addressing measConfig, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

The communication system of the previous embodiment, wherein the cellular network further includes a base station configured to communicate with the UE.

The communication system of the previous 2 embodiments, wherein: the processing circuitry of the host computer is configured to execute a host application, thereby providing the user data; and the UE's processing circuitry is configured to execute a client application associated with the host application.

A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

The method of the previous embodiment, further comprising at the UE, receiving the user data from the base station.

The communication system of the previous 2 embodiments, further including the base station, wherein the base station comprises a radio interface configured to communicate with the UE and a communication interface configured to forward to the host computer the user data carried by a transmission from the UE to the base station.

The communication system of the previous 3 embodiments, wherein: the processing circuitry of the host computer is configured to execute a host application; and the UE's processing circuitry is configured to execute a client application associated with the host application, thereby providing the user data.

The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

A method implemented in a communication system including a host computer, a base station and a user equipment (UE), the method comprising: at the host computer, receiving user data transmitted to the base station from the UE, wherein the UE performs any of the steps of any of the Group A embodiments.

The method of the previous embodiment, further comprising, at the UE, providing the user data to the base station.

The method of the previous 2 embodiments, further comprising: at the UE, executing a client application, thereby providing the user data to be transmitted; and at the host computer, executing a host application associated with the client application.

The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

The method of the previous embodiment, further comprising at the base station, receiving the user data from the UE.

The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single
   Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Chan-
   nel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference
   Signal Received Power
RSRQ Reference Signal Received Quality OR Reference
   Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a user equipment (UE), the method comprising:

the UE receiving from a master node (MN) a first radio resource control (RRC) reconfiguration message, wherein the first RRC reconfiguration message comprises:

i) a second RRC reconfiguration message generated by a source secondary node, wherein the second RRC reconfiguration message comprises a measurement configuration;

ii) a conditional reconfiguration information element (IE) generated by the MN, wherein the conditional reconfiguration IE contains at least a first measurement identifier (ID) that the MN obtained from the source secondary node (S-SN), and the first measurement ID is associated with the measurement configuration; and iii) a third RRC reconfiguration message comprising a fourth RRC message generated by a target secondary node (T-SN); and the UE, in response to the first RRC reconfiguration message, transmitting to the MN an RRC reconfiguration complete message responsive to the second RRC reconfiguration message.

2. The method of claim 1, wherein the first measurement ID is also associated with a report configuration, and the report configuration has a report type indicating that the report configuration is a conditional report configuration.

3. The method of claim 2, wherein the second RRC reconfiguration message further comprises the report configuration.

4. The method of claim 1, wherein the method further comprises:

detecting that a condition indicated in the conditional reconfiguration IE is satisfied; and as a result of detecting that the condition is satisfied, using information included in the fourth RRC reconfiguration message to perform a random access procedure to establish a connection with the T-SN.

5. The method of claim 4, further comprising:

after performing the random access procedure, transmitting to the MN a first RRC complete message comprising a second RRC complete message responsive to the fourth RRC reconfiguration message.

6. The method of claim 1, wherein transmitting the RRC reconfiguration complete message responsive to the second RRC reconfiguration message comprises:

generating an RRC reconfiguration complete message responsive to the RRReconfiguration message, wherein the RRC reconfiguration complete message responsive to the RRReconfiguration message comprises the RRC reconfiguration complete message responsive to the second RRC reconfiguration message; and transmitting to the MN the RRC reconfiguration complete message responsive to the RRReconfiguration message.

7. The method of claim 1, wherein the second RRC reconfiguration message further comprises the first measurement ID.

8. A non-transitory computer readable storage medium storing a computer program comprising instructions which when executed by processing circuitry of a network node causes the network node to perform the method of claim 1.

9. A method performed by a master node (MN), the method comprising:

receiving from a source secondary node (S-SN) a message that comprises: i) at least a first measurement identifier (ID) and ii) a first radio resource control (RRC) reconfiguration message that comprises a measurement configuration; and transmitting to a user equipment (UE) a second RRC reconfiguration message (RRCReconfiguration message), wherein the second RRC reconfiguration message transmitted to the UE comprises:

i) the first RRC reconfiguration message, and ii) a conditional reconfiguration information element (IE) generated by the MN, wherein the conditional reconfiguration IE contains the first measurement ID that the MN received from S-SN.

10. The method of claim 9, further comprising:

after receiving the message from the S-SN, transmitting a request message to a target secondary node (T-SN); and receiving from the T-SN an acknowledgment (ACK) message acknowledging receipt of the request message, the ACK message comprising a third RRC reconfiguration message, wherein the second RRC reconfiguration message transmitted to the UE further comprises the third RRC reconfiguration message.

11. The method of claim 10, further comprising generating a fourth RRC reconfiguration message, wherein the second RRC reconfiguration message transmitted to the UE comprises the fourth RRC reconfiguration message, and the further RRC reconfiguration message includes the third RRC reconfiguration message.

12. A non-transitory computer readable storage medium storing a computer program comprising instructions which when executed by processing circuitry of a network node causes the network node to perform the method of claim 9.

13. A method performed by source secondary node (S-SN), comprising:

transmitting to a master node (MN) a message associated with a user equipment (UE), the message comprising:

i) at least a first measurement identifier (ID), and ii) a first radio resource control (RRC) reconfiguration message that comprises a measurement configuration; and receiving an RRC reconfiguration complete message corresponding to the first RRC reconfiguration message, wherein the RRC reconfiguration complete message was transmitted to the MN by the UE and relayed by the MN to the S-SN.

14. A user equipment (UE), the UE comprising:

a storage medium;

processing circuitry coupled to the storage medium; and a receiver for receiving from a master node (MN) a first radio resource control (RRC) reconfiguration message, wherein the first RRC reconfiguration message comprises:

i) a second RRC reconfiguration message generated by a source secondary node (S-SN); and ii) a conditional reconfiguration information element (IE) generated by the MN, the second RRC reconfiguration message comprises a measurement configuration, the conditional reconfiguration IE contains at least a first measurement ID that the MN obtained from S-SN, and the first measurement ID is associated with the measurement configuration.

15. A network node, the network node comprising:

a receiver for receiving a message transmitted by a source secondary node (S-SN), wherein the message comprises: i) at least a first measurement identifier (ID) and ii) a first radio resource control (RRC) reconfiguration message that comprises a measurement configuration; and a transmitter for transmitting to a user equipment (UE) a second RRC reconfiguration message, wherein the second RRC reconfiguration message transmitted to the UE comprises:

i) the first RRC reconfiguration message, and ii) a conditional reconfiguration information element (IE) generated by the MN, wherein the conditional reconfiguration IE contains the first measurement ID that the MN received from S-SN.

16. A network node, the network node comprising:

a transmitter for transmitting to a master node (MN) a message associated with a user equipment (UE), the message comprising:

i) at least a first measurement identifier (ID), and ii) a first radio resource control (RRC) reconfiguration message that comprises a measurement configuration; and a receiver for receiving an RRC reconfiguration complete message corresponding to the first RRC reconfiguration message, wherein the RRC reconfiguration complete message was transmitted to the MN by the UE and relayed by the MN to the S-SN.

* * * * *